United States Patent
Sasaki et al.

(10) Patent No.: US 9,115,762 B2
(45) Date of Patent: Aug. 25, 2015

(54) ROLLING BEARING

(75) Inventors: Katsuaki Sasaki, Iwata (JP); Yoshiaki Ryouno, Iwata (JP); Shuguang Lian, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/128,870

(22) PCT Filed: Jun. 21, 2012

(86) PCT No.: PCT/JP2012/065856
§ 371 (c)(1),
(2), (4) Date: Dec. 23, 2013

(87) PCT Pub. No.: WO2013/002115
PCT Pub. Date: Jan. 3, 2013

(65) Prior Publication Data
US 2014/0133792 A1   May 15, 2014

(30) Foreign Application Priority Data

Jun. 27, 2011 (JP) ................................. 2011-141422
Aug. 4, 2011 (JP) ................................. 2011-170882

(51) Int. Cl.
*F16C 33/78* (2006.01)
*F16C 33/76* (2006.01)
*F16C 19/06* (2006.01)

(52) U.S. Cl.
CPC ......... *F16C 33/7856* (2013.01); *F16C 33/7823* (2013.01); *F16C 33/7833* (2013.01); *F16C 19/06* (2013.01); *F16C 2220/04* (2013.01); *F16C 2326/01* (2013.01); *F16C 2361/61* (2013.01)

(58) Field of Classification Search
CPC .. F16C 19/06; F16C 33/7823; F16C 33/7826; F16C 33/7889; F16C 33/7856

USPC ......... 384/462–463, 477, 482, 478, 484, 485; 277/351, 352, 399, 404
See application file for complete search history.

(56) References Cited

U.S. PATENT DOCUMENTS 3,572,857 A * 3/1971 Hasegawa ..................... 384/482
3,601,457 A * 8/1971 Helms ........................... 384/485

(Continued)

FOREIGN PATENT DOCUMENTS

CN   102066786   5/2011
EP   2 431 624 A1   3/2012

(Continued)

OTHER PUBLICATIONS

PCT International Preliminary Report on Patentability mailed Jan. 16, 2014 in corresponding International Application No. PCT/JP2012/065856.

(Continued)

*Primary Examiner* — Marcus Charles

(57) ABSTRACT

A rolling contact bearing assembly includes a seal member having a seal lip segment. The seal lip segment includes a waist portion having, as viewed in a cross section, a bent V-shape such that a surface of the seal lip segment on outer side defines a relief recess and also includes a protrusion portion distal to the waist portion and having a tapered shape narrowing towards a free end thereof. The seal member installed in the bearing assembly applies urging force on one of inner and outer raceway rings, against change in degree of interference of the protrusion portion with the raceway ring. The protrusion portion includes such high wear material that rotation of the bearing assembly results in wear of the protrusion portion to cause the protrusion portion to make non-contact status or light contact status of a contact pressure of substantially zero.

16 Claims, 15 Drawing Sheets

(56) References Cited

U.S. PATENT DOCUMENTS

| | | | | |
|---|---|---|---|---|
| 4,643,594 A | * | 2/1987 | Neder et al. | 384/478 |
| 4,695,062 A | * | 9/1987 | Dreschmann et al. | 277/353 |
| 4,733,978 A | * | 3/1988 | Colanzi et al. | 277/375 |
| 5,042,822 A | * | 8/1991 | Dreschmann et al. | 277/353 |
| 5,470,158 A | * | 11/1995 | McLarty et al. | 384/484 |
| 5,840,666 A | * | 11/1998 | Yokouchi et al. | 508/291 |
| 6,450,691 B1 | * | 9/2002 | Okuma et al. | 384/462 |
| 6,715,922 B2 | * | 4/2004 | Asai et al. | 384/482 |
| 6,919,301 B2 | * | 7/2005 | Nakatani et al. | 508/391 |
| 7,217,036 B2 | * | 5/2007 | Ishiguro et al. | 384/484 |
| 8,714,827 B2 | | 5/2014 | Ishikawa et al. | |
| 8,727,631 B2 | | 5/2014 | Wakuda et al. | |
| 2005/0152628 A1 | * | 7/2005 | Egami et al. | 384/462 |
| 2008/0166080 A1 | * | 7/2008 | Kawamura | 384/462 |
| 2011/0069918 A1 | | 3/2011 | Wakuda et al. | |
| 2011/0222805 A1 | | 9/2011 | Sasaki et al. | |
| 2012/0051680 A1 | | 3/2012 | Ishikawa et al. | |

FOREIGN PATENT DOCUMENTS

| | | | | |
|---|---|---|---|---|
| GB | 811356 A | * | 4/1959 | |
| JP | 8-296658 | | 11/1996 | |
| JP | 2003-287040 | | 10/2003 | |
| JP | 2007-107588 | | 4/2007 | |
| JP | 2008157370 A | * | 7/2008 | |
| JP | 2010-112472 | | 5/2010 | |
| JP | 2010-261545 | | 11/2010 | |
| JP | 2011089622 A | * | 5/2011 | |
| JP | 2011-106603 | | 6/2011 | |
| WO | WO 2009/150935 A1 | | 12/2009 | |
| WO | WO 2010/131619 A1 | | 11/2010 | |
| WO | WO 2011/074468 A1 | | 6/2011 | |

OTHER PUBLICATIONS

International Search Report mailed Sep. 11, 2012, in corresponding International Application No. PCT/JP2012/065856.

European Search Report issued Mar. 10, 2015 in corresponding European Patent Application No. 12805230.5.

Japanese Notice of Reason(s) of Rejection issued Feb. 24, 2015 in corresponding Japanese Patent Application No. 2011-170882.

Chinese Office Action issued May 19, 2015 in corresponding Chinese Patent Application No. 201280031382.3.

* cited by examiner

INNER SIDE OF BEARING          OUTER SIDE OF BEARING

ROLLING BEARING

CROSS REFERENCE TO THE RELATED APPLICATIONS

This application is a U.S. national stage application of PCT/JP2012/065856 filed Jun. 21, 2012, and is based on and claims the foreign priority benefit of Japanese Patent Application No. 2011-141422 filed Jun. 27, 2011, and Japanese Patent application No. 2011-170882 filed Aug. 4, 2011, in the Japanese Patent Office, the entire disclosures of which are herein incorporated by reference as a part of this application.

BACKGROUND OF THE INVENTION

1. Field of the Invention

The present invention relates to a rolling bearing assembly that may be employed in or for a vehicle transmission.

2. Description of Related Art

Within a vehicle transmission, a wide variety of substances or objects, such as wear debris from gears, may exist. To ensure protection against these potential contaminants, a conventional bearing assembly employed in a vehicle transmission may be equipped with a contact type sealing plate (i.e. seal member). Such a contact type seal member may seal a bearing space to prevent possible contaminants from entering the inside of the bearing assembly. However, a contact type seal member may generate a sealing torque. One of the barriers to improving the fuel economy of a vehicle may be how to reduce such mechanical loss.

Conventional techniques used to reduce mechanical loss may involve reduction of contact force that may be generated at a seal lip. For example, a shot peening process may be performed on a surface with which a contact-type seal lip comes in contact, to reduce the surface's maximum roughness Ry down to 2.5 μm or below. This may achieve reduction of a sealing torque caused by the operation of a seal lip (see the Patent Document 1 listed below).

[Patent Document 1] JP Laid-open Patent Publication No. 2007-107588

[Patent Document 2] JP Laid-open Patent Publication No. H08-296658

SUMMARY OF THE INVENTION

Reduction of sealing torque in such a sealed bearing assembly as disclosed in the Patent Document 1 listed above may be still limited and unsatisfactory. To address this, the Applicant came up with a highly wearable rubber seal 50 such as shown in FIG. 16, as a product that may contribute to improving the fuel economy of a vehicle. The highly wearable rubber seal 50 may, despite its low-friction property, provide sufficient contaminants-blocking performance required for application of a bearing assembly in a transmission. The highly wearable rubber seal 50 includes a lip tip end 51 that may be made of highly wearable rubber material. The lip tip end 51 may have a lip interference δ1 with a peripheral surface 52 of a raceway ring which the lip tip end 51 contacts. Operation of the bearing assembly may result in wear of the lip tip end 51. This may achieve reduction of a sealing torque while at the same time providing improved contaminants-blocking performance.

By the way, a bearing assembly equipped with such a highly wearable rubber seal 50 may use oil lubricant. Under oil lubrication, the wear of the seal may take considerable time. More specifically, a seal member in a conventional bearing assembly may not be worn as desired, if an urging force which is responsive to the degree of lip interference is not adequately provided.

An object of the present invention is to provide a rolling contact bearing assembly, which may enable a seal member to be adequately and reliably worn regardless of the degree of interference of a seal lip segment of the seal member, thus achieving reduction of a sealing torque while at the same time providing improved contaminants-blocking performance.

In accordance with the present invention, a rolling contact bearing assembly includes: an inner raceway ring including a raceway surface; an outer raceway ring including a raceway surface; a plurality of rolling elements interposed between the raceway surface of the inner raceway ring and the raceway surface of the outer raceway ring; and a seal member to seal a bearing space defined between the inner raceway ring and the outer raceway ring. The seal member includes a seal member body having a base end secured to one of the inner and outer raceway rings and a tip end formed with a seal lip segment that is in contact with the other one of the inner and outer raceway rings. The seal lip segment including a waist portion forming a radially intermediate area of the seal lip segment, the seal lip segment having, as viewed in a cross section, a bent V-shape at the waist portion such that a surface of the seal lip segment facing an outer side of the bearing space defines a relief recess. The seal lip segment also includes a protrusion portion that is distal with respect to the waist portion, the protrusion portion having a tapered shape that narrows towards a free end of the protrusion portion. The seal member is installed to the bearing assembly in such a way to apply an urging force on the other one of the inner and outer raceway rings, against a change in the degree of interference of the protrusion portion with the other one of the inner and outer raceway rings. The protrusion portion of the seal lip segment includes such high wear material that rotation of the bearing assembly results in wear of the protrusion portion to cause the protrusion portion to make non-contact status or light contact status of a contact pressure that is substantially zero. The term "high wear material" used herein refers to material that is prone to wear.

With such a configuration, the seal member that is initially a contact-type seal member will be worn during operation and will turn into a non-contact type or light-contact type seal member. More specifically, rotation in the bearing assembly will result in wear of the protrusion portion of the seal lip segment. As the wear of the protrusion portion progresses during operation, the degree of interference of the protrusion portion with the other one of the inner and outer raceway rings may change. The aforementioned seal member, however, may catch up with the change in the degree of that interference and apply a substantially constant urging force against the other one of the inner and outer raceway rings. This may enable the protrusion portion of the seal lip segment to quickly but reliably wear at the physical contact of the protrusion portion against the other one of the inner and outer raceway rings. In this way, an optimized small gap (e.g. labyrinth gap) may be created between the seal lip segment and the other one of the inner and outer raceway rings.

Further, the seal lip segment has a bent V-shape at a radially intermediate area of the seal lip segment. This may, even as the wear of the protrusion portion progresses during operation of the bearing assembly, allow the seal lip segment to maintain a substantially constant conformation while also keeping a substantially constant urging force (i.e. reaction force) against the other one of the inner and outer raceway rings. More specifically, the seal member may be installed to the bearing assembly such that a seal lip segment flexes at a waist portion of the seal lip segment to urge a lip tip area—an area that may be defined by a protrusion portion of the seal lip segment—to the other one of the inner and outer raceway rings with a contact pressure that enables the wear of the lip tip area. As the other one of the inner and outer raceway rings rotates and the wear of the protrusion portion progresses, the flex at the waist portion may catch up with the progression of the wear of the protrusion portion by being biased to return to its original state or shape before installation of the seal member to the bearing assembly. This may ensure that the wear of the protrusion portion progresses in a continuous manner. Then, the reaction force to urge the seal lip segment to the other one of the inner and outer raceway rings may approach "zero." In this way, the wear process of the seal lip segment is completed, and an optimized labyrinth gap may be created.

Such a labyrinth gap that may be created in this way may have the following effects or advantages:
(1) Sealing torque may be reduced or eliminated.
(2) Possible temperature rise by the self-heating of the bearing assembly may be suppressed, as compared with a conventional product.
(3) Such suppression of possible temperature rise by the self-heating of the bearing assembly may allow for the use of oil with a viscosity lower than those of conventionally used oils.
(4) The total loss in a transmission may be reduced.
(5) With such a labyrinth gap, contaminant particles with larger diameters that may undesirably affect the service life of the bearing assembly may be prevented from entering the inside of the bearing assembly.

In this way, a seal member may be adequately and reliably worn regardless of the degree of interference of a seal lip segment of the seal member, thus achieving reduction of a sealing torque while at the same time providing improved contaminants-blocking performance.

The high wear material may include rubber material or resinous material. In a configuration where the high wear material includes rubber material, the seal member may include a vulcanization-molded article of the rubber material. In a configuration where the high wear material includes resinous material, the seal member may include an injection-molded article of the resinous material.

The seal member may include an annular metal core and elastic member covering a part or an entirety of the metal core, and the seal lip segment may include the elastic member. The elastic member may cover an entirety of the metal core. In such a case, the seal member body may include, at the base end of the seal member body, the elastic member. Further, a part of the elastic member at the base end of the seal member body may be secured, while being elastically deformed, to the one of the inner and outer raceway rings. Such a configuration may establish more improved sealing between the one of the inner and outer raceway rings and the base end of the seal member body.

The seal member may include the elastic member that is vulcanization-molded or injection-molded to a part or an entirety of the metal core. The high wear material may include solid lubricant, non-woven fabric or mild steel.

The seal lip segment may be so shaped as to radially contact the other one of the inner and outer raceway rings. The seal lip segment may be so shaped as to axially contact the other one of the inner and outer raceway rings.

The seal member body may include, at the base end of the seal member body, elastic member made of rubber material, and the elastic member may be fittedly secured to the one of the inner and outer raceway rings. In such a case, the elastic member including rubber material may be fittedly secured, while being elastically deformed, to the one of the inner and outer raceway rings. Such a configuration may establish more improved sealing between the one of the inner and outer raceway rings and the base end of the seal member body.

The seal member body may include, at the base end of the seal member body, a metal core made of metallic material, and the metal core may be fittedly secured to the one of the inner and outer raceway rings. With such a configuration, the seal member may acquire increased rigidity. For example, such a seal member may acquire greater rigidity as compared with a seal member that includes elastic member covering an entirety of a metal core of the seal member. In this way, such a configuration may more reliably ensure that an urging force is applied against the other one of the inner and outer raceway rings.

The bearing assembly may be configured to be employed in a vehicle transmission. In this case, an optimized labyrinth gap that may be created during operation of the bearing assembly may prevent possible contaminants in a transmission, such as wear debris from gears, from entering the inside of the bearing assembly. Also, sealing torque may be reduced or eliminated, thus improving the fuel economy of a vehicle.

The protrusion portion of the seal lip segment may include molded rubber material or molded resinous material, in which the protrusion portion may include a seal lip slidingly movable portion that is protruding from an inner or outer peripheral edge of the protrusion portion to be in slidingly contact with the other one of the inner and outer raceway rings, in which the seal lip slidingly movable portion may correspond to an area molded at a parting line of a seal production mold that manufactures the seal member in such a way that a lip tip end at the seal lip slidingly movable portion aligns with the parting line, in which the lip tip end may include a burr, and in which the lip tip end including the burr may include such high wear material that rotation in the bearing assembly results in wear of the lip tip end to cause the lip tip end to be no longer in contact or to be in light contact with the other one of the inner and outer raceway rings, with the light contact being defined as contact with a contact pressure that is substantially zero.

With such a configuration, the seal lip slidingly movable portion of the seal lip segment will be worn in a way that reduction or elimination of a sealing torque will be quickly but sufficiently achieved. More specifically, the tip lip end at the seal lip slidingly movable portion which may, when molded, align with a parting line of the seal production mold may include a burr, and the lip tip end including the burr will be worn. The burr at the lip tip end may define a starting point of the wear, thus facilitating the wear of the seal lip slidingly movable portion. To cause a seal lip segment to be quickly worn, a lip tip end may need to include thinner portions. Molding such thinner portions, however, may be difficult and may result in reduced yield.

In contrast, in the present invention, a beneficial use of "burr" may be made, which may be an inevitable outcome of a molding process and which is, in principle, unwanted. Tiny little burr(s) that may be present on the lip tip end may have small contact surface area(s), against the other one of the inner and outer raceway rings. In this way, such burr(s) will be quickly ground away during operation of the bearing assembly.

As such, with the aforementioned configuration, a lip tip end may be worn more quickly than a conventional product, thus facilitating reduction or elimination of a sealing torque. Also, with the aforementioned configuration, a deburring treatment of the seal lip slidingly movable portion after a seal molding process may not be necessary. This may enable reduction of the number of processing steps, which may, in turn, enable reduction of production cost.

The seal lip slidingly movable portion may be configured such that rotation in the bearing assembly results in wear of only the burr. In this case, only the burr will be worn unlike configuration(s) where portions with larger sliding contact surfaces are designed to be worn. In this way, a lip tip end may be worn more quickly than a conventional product.

The one of the inner and outer raceway rings may include a peripheral surface, confronting the other one of the inner and outer raceway rings, formed with a seal mount groove into which the seal member is fittedly secured, wherein the seal member includes an annular metal core and an elastic member provided integrally with the metal core to cover the metal core, and wherein a part of the metal core and a part of the elastic member form a base end of the seal member forming a mountable segment that is fittedly secured into the seal mount groove. In such a configuration, the mountable segment of the seal member may be securely and firmly fitted into the seal mount groove, thus further improving the wearability of the seal lip slidingly movable portion.

The seal production mold that molds the seal member may include first and second mold dies, in which the first mold die may include an annular cavity segment designed to form an inner side part of the seal member, in which the second mold die may include an annular cavity segment designed to form an outer side part of the seal member, in which the first and second mold dies may be configured to mate with each other to create a cavity in which the seal member is molded, and in which mate faces of these two mold dies may define the parting line. In this case, the lip tip end that is intended to be worn may be molded at or between the mate surfaces of these two mold dies. This may ensure the formation of the burr through a molding process, which will be worn during operation of the bearing assembly.

Only the seal lip slidingly movable portion of the seal lip segment may include the high wear material. In such a configuration, other areas of the seal lip segment may be made of general material, thus enabling reduction of material cost.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

DESCRIPTION OF THE EMBODIMENTS

Figure 1:
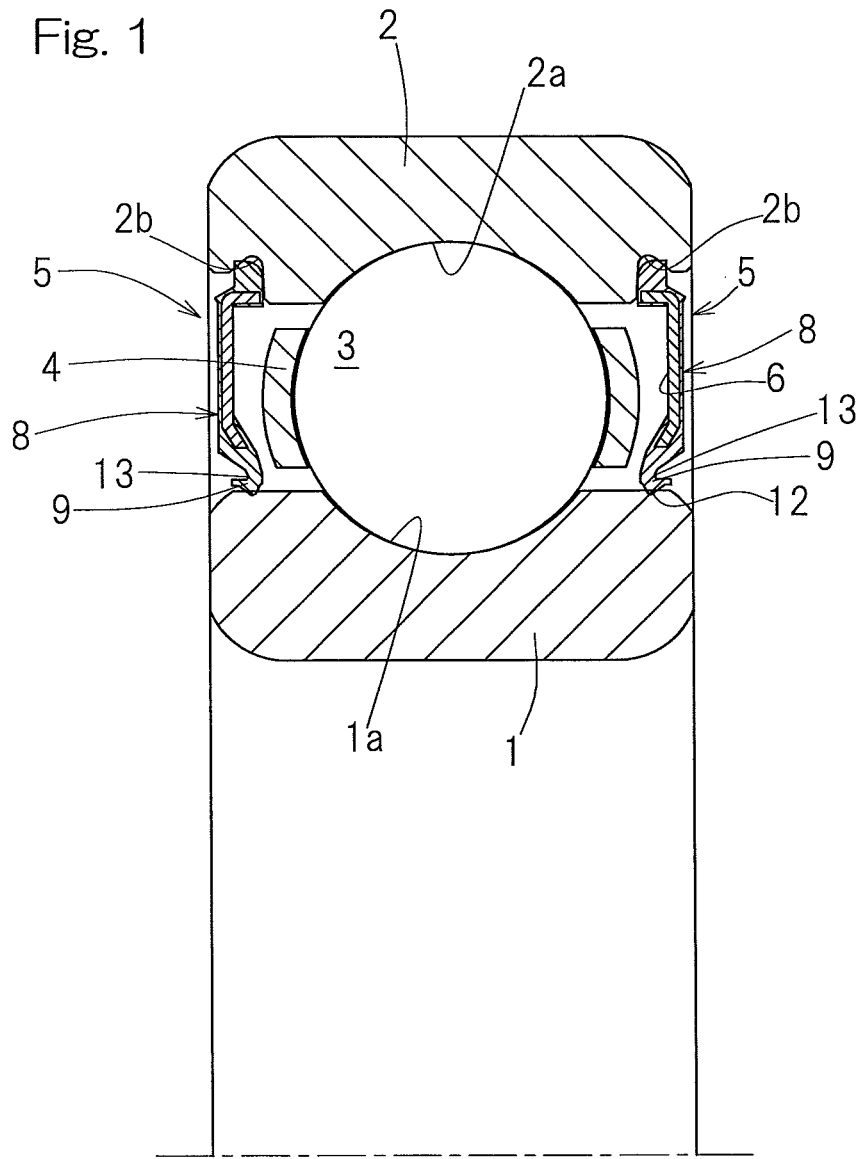
FIG. 1 a vertical cross sectional view of a rolling contact bearing assembly according to the first embodiment of the present invention.

The first embodiment of the present invention will be described in connection with FIG. 1 to FIG. 6. A rolling contact bearing assembly according to this embodiment may be employed in or incorporated into, for example, a vehicle transmission. A method of mounting or installing a seal member to the bearing assembly will also be discussed in the following description. Referring to FIG. 1, the bearing assembly includes an inner raceway ring 1 including a raceway surface 1a, an outer raceway ring 2 including a raceway surface 2a, and a plurality of rolling elements 3 interposed between the raceway surface 1a of the inner raceway ring 1 and the raceway surface 2a of the outer raceway ring 2. The inner raceway ring 1, the outer raceway ring 2 and the rolling elements 3 may be made of steel. Non-limiting examples of such steel include high-carbon chromium bearing steel (e.g. SUJ2), and martensitic stainless steel. The bearing assembly may include a cage 4 for retaining the rolling elements 3. The bearing assembly includes a seal member 5 for sealing an annular bearing space defined between the inner and outer raceway rings 1, 2. The seal member 5 may be provided at each of the opposite ends of the bearing space. The bearing assembly may be prefilled with grease. The bearing assembly may be a deep-groove ball bearing as illustrated, where the rolling elements 3 are in the form of balls. In the example under discussion, the inner raceway ring 1 may be a rotational raceway ring, and the outer raceway ring 2 may be a stationary raceway ring, thus constituting an inner ring rotating type bearing assembly. The bearing assembly may be a sealed angular contact ball bearing assembly or a sealed thrust bearing assembly. Also, the inner raceway ring 1 may be a stationary raceway ring and the outer raceway ring 2 may be a rotational raceway ring, thus constituting an outer ring rotating type bearing assembly.

Figure 2A:
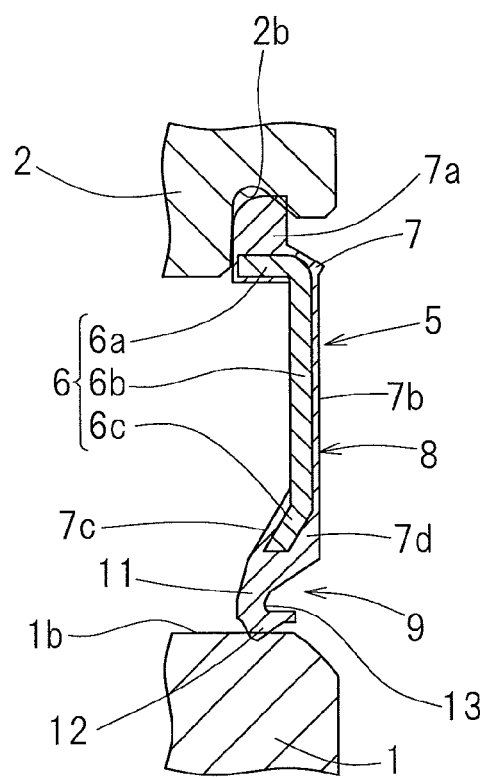
FIG. 2A is an enlarged cross sectional view of the rolling contact bearing assembly at a seal member installed to the bearing assembly.

Referring to FIG. 2A, an inner peripheral surface of the outer raceway ring 2 may include a seal mount groove 2b into which the seal member 5 (e.g. annular seal member) may be fittedly secured. The seal member 5 may include an annular metal core 6 and an elastic member 7. The elastic member 7 may be fixedly adhered to the metal core 6 to be integral with the metal core 6. The metal core 6 and a majority portion of the elastic member 7 may form a seal member body 8. The rest portion of the elastic member 7—in the example under discussion, an inner peripheral region of the elastic member 7—may form a seal lip segment 9. The seal lip segment 9 may be so shaped as to radially contact the inner raceway ring 1. The elastic member 7 may cover—in the example under discussion, an entirety of the metal core 6 except an inner side surface of an upright segment 6b of the metal core 6. The seal member 5 may include a vulcanization-molded article of a rubber material. In such a vulcanization molding process, the elastic member 7 is adhered to the metal core 6 that may be made of metallic material.

The metal core 6 may include, starting from a radially outward side of the metal core 6, a cylindrical segment 6a, the aforementioned upright segment 6b and a diagonally extending segment 6c in this order. The upright segment 6b may be positioned axially inwards of end faces of the inner and outer raceway rings 1, 2 while being parallel to these end faces of the inner and outer raceway rings 1, 2. The upright segment 6b may be continuous, at a base end thereof, with the cylindrical segment 6a. In this way, the cylindrical segment 6a and the upright segment 6b may form an L cross sectional shape. An outer periphery of the seal member 5 (e.g. a part of the elastic member 7) on an outer peripheral surface of the cylindrical segment 6a, together with the cylindrical segment 6a itself, may form a base end of the seal member 5. The base end of the seal member 5 may define a base end of the seal member body 8. The base end of the seal member body 8 may form a mountable segment 7a of the seal member 5 that may be fittedly secured into the seal mount groove 2b that may be formed in the outer raceway ring 2. In such a configuration, the mountable segment 7a of the seal member 5 may be securely and firmly fitted into the seal mount groove 2b. Also, in such a configuration, the aforementioned mountable segment 7a of the seal member 5 may be secured, while being elastically deformed, into the seal mount groove 2b. This may establish more improved sealing between the outer raceway ring 2 and the base end of the seal member body 8. The upright segment 6b may be continuous, at a tip end thereof, with the diagonally extending segment 6c. The diagonally extending segment 6c is inclined axially inwardly towards radially inwardly.

Figure 2B:
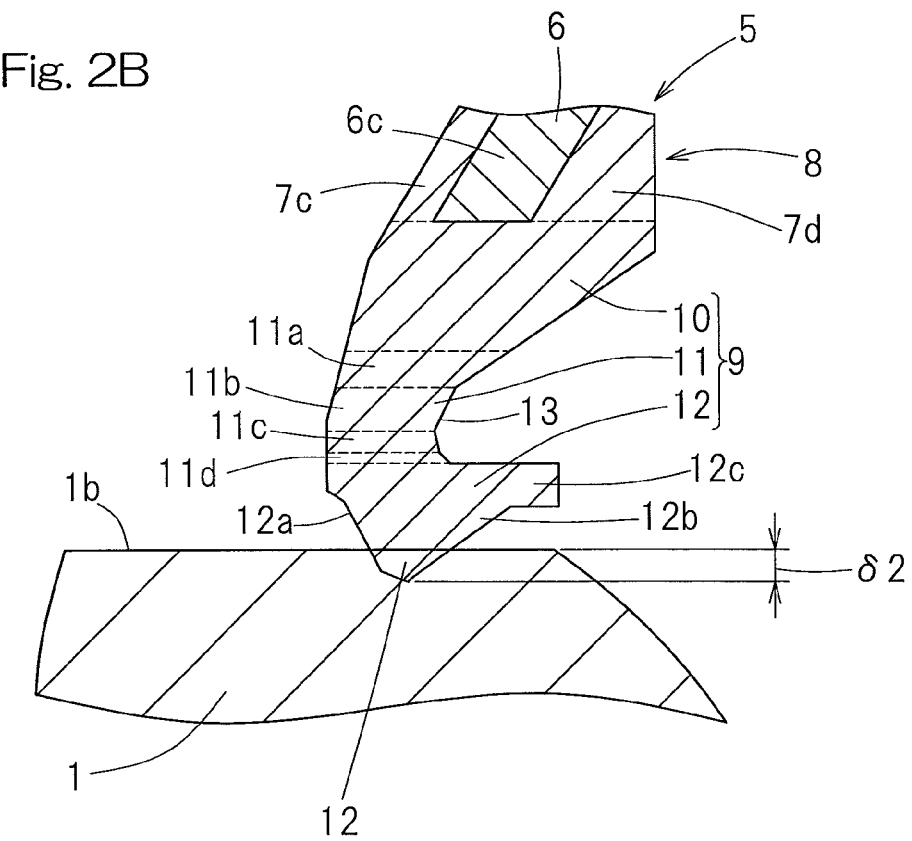
FIG. 2B is an enlarged cross sectional view of the seal member at a seal lip segment of the seal member.

The upright segment 6b of the metal core 6 has an outer side surface that may be covered with an overlay 7b that may have a thin, uniform thickness. The diagonally extending segment 6c has an inner side surface that may be covered with an overlay 7c and an outer side surface that may be covered with an overlay 7d. A radially inward tip end of the overlay 7c, together with a radially inward tip end of the overlay 7d, may define a tip end of the seal member body 8. The seal lip segment 9 that may be in contact with an outer peripheral surface 1b of the inner raceway ring 1 may be integral with the tip end of the seal member body 8. The elastic member 7 may include the aforementioned mountable segment 7a, the overlay 7b, the overlay 7c, the overlay 7d and the seal lip segment 9. In FIG. 2A and FIG. 2B, although a free end of the seal lip segment 9 appears as if that free end extends into the inner raceway ring 1, actually, the free end of the seal lip segment 9 contacts with a certain degree of interference with the inner raceway ring 1, when the seal member 5 is installed to the bearing assembly.

Referring to FIG. 2B, the seal lip segment 9 may include, starting from a radially outward side of the seal lip segment 9, a seal lip base end portion 10, a waist portion 11 and a protrusion portion 12 in this order. The seal lip base end portion 10, the waist portion 11 and the protrusion portion 12 may be formed integrally with each other or in one-piece construction. The seal lip base end portion 10 may extend radially inwards for a predefined distance from an inner peripheral edge of the diagonally extending segment 6c of the metal core 6 to form a radial base end area of the seal lip segment 9. The seal lip base end portion 10 may have, as viewed in a cross section, a shape having a thickness that reduces towards an inner diameter end or a tip end of the seal lip base end portion 10—in other words, towards the waist portion 11. The seal lip base end portion 10 has an inner side surface facing an inner side of the bearing space and also has an outer side surface facing a side of the bearing space that is opposite to the inner side of the bearing space. Each of the inner side surface and the outer side surface of the seal lip base end portion 10 may have, as viewed in a cross section, a shape that is inclined axially inwardly towards radially inwardly.

The waist portion 11 may form a radially intermediate area of the seal lip segment 9—that is, an intermediate area between the seal lip base end portion 10 and the protrusion portion 12. When the seal member 5 is installed to the bearing assembly—in other words, when the seal lip segment 9 engages an outer peripheral surface 1b of the inner raceway ring 1, the seal lip segment 9 may have, as viewed in a cross section, a bent V-shape at the waist portion 11 such that a surface of the seal lip segment 9 facing an outer side of the bearing space defines a relief recess 13. In the illustrated example, the relief recess 13 is not limited to such an outer side surface of the waist portion 11; rather, the combination of an outer side surface of the waist portion 11 and an outer side surface of the seal lip base end portion 10 may define the relief recess 13. The aforementioned cross section may be defined as a cross section of the seal member 5 taken along a plane containing an axis of the bearing assembly.

The waist portion 11 may have, as viewed in a cross section, a shape having a thickness that is smaller at a radially intermediate location of the waist portion 11 and increases towards each of the opposite, radial ends of the waist portion 11. More specifically, the waist portion 11 may include, starting from a radially outward side thereof towards a radially inward side thereof, a first waist subportion 11a, a second waist subportion 11b, a third waist subportion 11c and a fourth waist subportion 11d in this order. In this way, the first, second, third and fourth waist subportions 11a to 11d may cooperate with each other to form the aforementioned relief recess 13. The first waist subportion 11a, which may form a radially outermost subarea of the waist portion 11, may have, as viewed in a cross section, a shape having a thickness that reduces towards a radially inward side. The first waist subportion 11a has an outer side surface and also has an inner side surface facing an inner side of the bearing space. The inner side surface of the first waist subportion 11a may be continuous with an inner side surface of the seal lip base end portion 10 so as to be flat with the inner side surface of the seal lip base end portion 10. The outer side surface of the first waist subportion 11a may be continuous with an outer side surface of the seal lip base end portion 10 so as to be flat with the outer side surface of the seal lip base end portion 10. An angle of the outer side surface of the first waist subportion 11a relative to a plane perpendicular to an axis of the bearing assembly greater than an angle of the inner side surface of the first waist subportion 11a relative to the same plane.

The second waist subportion 11b continued from the first waist subportion 11a may have, as viewed in a cross section, a shape having a thickness that slightly reduces towards a radially inward side. More specifically, an inclination angle of an outer side surface of the second waist subportion 11b relative to the aforementioned plane may be smaller than an inclination angle of the outer side surface of the first waist subportion 11a relative to the same plane. Each of the third waist subportion 11c and the fourth waist subportion 11d may have, as viewed in a cross section, a shape having a thickness that increases towards a radially inward side of the corresponding one of the third and fourth waist subareas 11c, 11d. An inner side surface of the third waist subportion 11c may be continuous with a radially inward edge of an inner side surface of the second waist subportion 11b. An outer side surface of the third waist subportion 11c may have, as viewed in a cross section, a shape that is inclined relative to the aforementioned plane axially outwardly towards radially inwardly. An inner side surface of the fourth waist subportion 11d may be continuous with a radially inward edge of the inner side surface of the third waist subportion 11c. An outer side surface of the fourth waist subportion 11d may have, as viewed in a cross section, a shape that is inclined relative to the aforementioned plane axially outwardly towards radially inwardly.

The protrusion portion 12 that is distal with respect to the waist portion 11 may have a tapered shape that narrows towards a free end of the protrusion portion 12. The protrusion portion 12 has an inner side surface 12a facing an inner side of the bearing space and also has an outer side surface 12b facing an outer side of the bearing space. The inner side surface 12a of the protrusion portion 12 may have, as viewed in a cross section, a shape that is inclined axially inwardly towards radially inwardly. The outer side surface 12b of the protrusion portion 12 may have, as viewed in a cross section, a shape that is inclined axially inwardly towards radially inwardly. In this way, the protrusion portion 12 may have, as viewed in a cross section, a tapered triangular shape having an axial thickness that reduces towards a free end of the protrusion portion 12. Such a configuration may facilitate the application of a contact pressure against the seal lip segment 9 that enables the wear of the protrusion portion 12.

Figure 17:
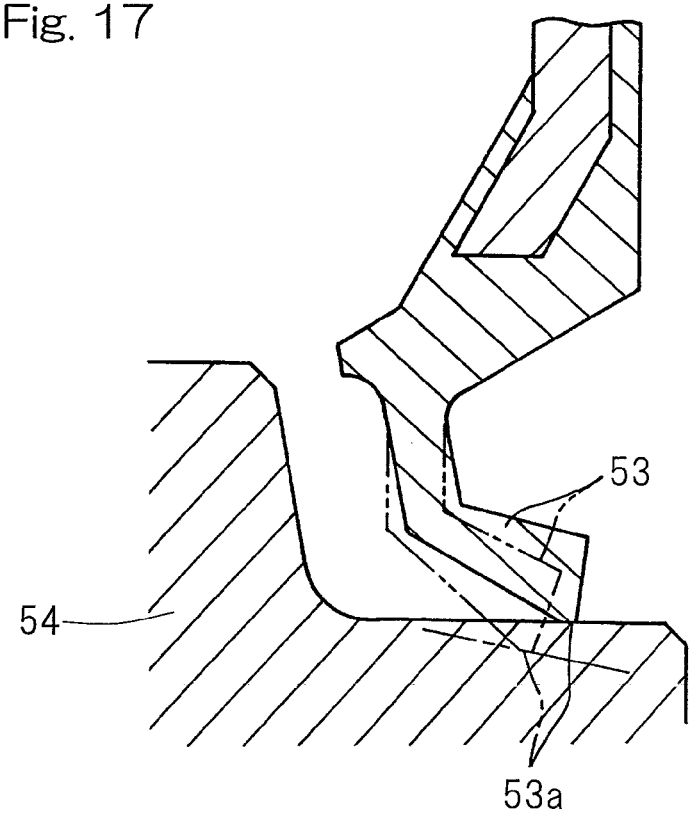
FIG. 17 is a vertical cross sectional view of a relevant region at a seal lip of another conventional product.

FIG. 17 is a vertical cross sectional view of a relevant region at a seal lip of another conventional product. The Applicant has proposed a technique such as shown in FIG. 17 (see the Patent Document 2 as mentioned earlier). FIG. 17 contains a long dashed double-short dashed line to depict a seal lip 53 in its original state or shape before installation to a bearing assembly and also contains a solid line to depict the same seal lip 53 after installation to a bearing assembly. Before installation to a bearing assembly, an inner diameter surface 53a of the seal lip 53 may define such a tapered surface that faces an inner side of the bearing space of the bearing assembly. After installation to a bearing assembly, the inner diameter surface 53a of the seal lip 53 in contact with the inner raceway ring 54 while being elastically deformed. This conventional product is designed to apply a certain load to the seal lip 53 to enable the seal lip 53 to perform sealing for a bearing assembly. However, in this conventional product, while a tiny wear may occur on the seal lip 53 during operation of the bearing assembly, such wear is not intentional. More specifically, the load applied to the seal lip 53 is not designed to intentionally cause wear on the seal lip 53. An urging pressure to urge a lip tip end of the seal lip 53 against a surface may be so small that it only causes the seal lip 53 to undergo elastic deformation. In contrast, as shown in FIG. 2B, an embodiment of the present invention under discussion may be such that a load is applied to a free end of the protrusion portion 12 of the seal lip segment 9 to intentionally cause wear of a tip end of the seal lip segment 9.

The protrusion portion 12 may include, at a radially outward end thereof, an axial extension 12c that axially protrudes towards an outer side of the bearing space. The axial extension 12c may be configured not to contact an outer side surface of the seal lip base end portion 10.

The axial extension 12c may not contact an outer side surface of the seal lip base end portion 10 for the following reason. An urging force to urge a lip tip end against the inner raceway ring 1 is intended to be only attributable to elasticity of rubber material. Contact and engagement of the axial extension 12c with an outer side surface of the seal lip base end area 10 might generate an unwanted load that would add to elasticity of rubber material, thus leading to increased resistance to rotation in the bearing assembly. Such increase in the load applied to a seal lip may facilitate wear of the seal lip, but this may occur at the cost of increased chance of occurrence of slip on the side of the outer raceway ring. In such a case, increase in drag torque may be necessary to avoid such occurrence of slip. (When the torque applied on an inner raceway ring side becomes greater than the torque applied on an outer raceway ring side, slip may occur on the side of the outer raceway ring. Such slip may hinder wear of a seal lip provided at a radially inward side of the seal.)

The protrusion portion 12 may include such high wear material that rotation of the bearing assembly results in wear of the protrusion portion 12 to cause the protrusion portion 12 to make non-contact status or light contact status of a contact pressure that is substantially zero. In the example under discussion, only the protrusion portion 12 forming a free end area may include the high wear material. However, the present invention is not limited to such a configuration. For example, the protrusion portion 12 and the waist portion 11 may include the high wear material. In another example, an entirety of the seal lip segment 9—in particular, the protrusion portion 12, the waist portion 11 and the seal lip base end portion 10—may include the high wear material. The high wear material may include high wear rubber material. Examples of the high wear material include resinous material, solid lubricant, non-woven fabric and mild steel. In a configuration where the high wear material includes resinous material, the seal member 5 may include an injection-molded article of the resinous material that may be molded with an injection mold assembly (not shown).

The seal member 5 may be installed to the bearing assembly in such a way to create so-called interference δ2 at free end of the protrusion portion 12 of the seal lip segment 9, against an outer peripheral surface 1b of the inner raceway ring 1. The seal member 5 may be installed to the bearing assembly in such a way to apply a substantially constant urging force on the inner raceway ring 1, against a change in the degree of the interference δ2 of the protrusion portion 12 with the inner raceway ring 1. Under such conditions, rotation of the inner raceway ring 1 may result in wear of the protrusion portion 12.

A mechanism of how wear on the seal lip segment 9 may be caused will now be described. The seal lip segment 9 may be shaped to have, as viewed in a cross section, a bent V-shape such as the one that is mentioned earlier. Such a seal lip segment 9 may be held in contact with an outer peripheral surface 1b of the inner raceway ring 1, thus generating an urging force or a reaction force to urge the protrusion portion 12 against the inner raceway ring 1. More specifically, the seal lip segment 9 may be shaped to have, as viewed in a cross section, a bent V-shape at the waist portion 11 which may form a radially intermediate area of the seal lip segment 9, such that a surface of the seal lip segment 9 which faces an outer side of the bearing space defines a relief recess 13. Such a configuration of the seal lip segment 9b may enable the seal lip segment 9b to act as a spring that flexes at the waist portion 11, which may urge the protrusion portion 12 against the inner raceway ring 1 with a contact pressure that enables the wear of the protrusion portion 12. As the inner raceway ring 1 rotates and the wear of the protrusion portion 12 progresses, the flex at the waist portion 11 may catch up with the progression of the wear of the protrusion portion 12 by being biased to return to its original state or shape before installation of the seal member to the bearing assembly. This may ensure that the wear of the protrusion portion 12 progresses in a continuous manner. Then, the reaction force to urge the seal lip segment 9 to the inner raceway ring 1 (which may often be referred to as "seal lip reaction force") may approach "zero." In this way, the wear process of the seal lip segment 9 is completed, and an optimized labyrinth gap may be created.

Figure 4:
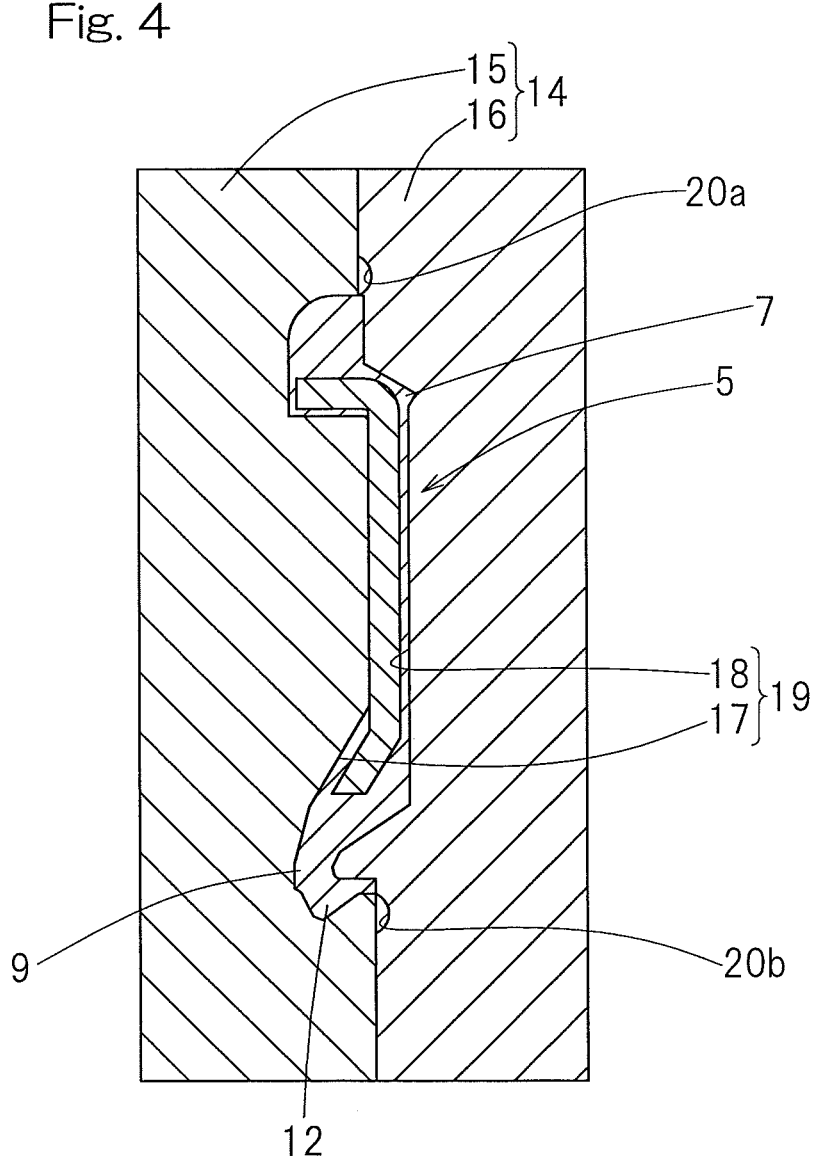
FIG. 4 is a vertical cross sectional view of a seal production mold that may mold the seal member.

Referring to FIG. 4, a seal production mold 14 that molds the seal member 5 may include two mold dies 15, 16 that may be configured to mate with each other. One of the mold dies 15, 16 may include an annular cavity segment 17 designed to form an inner side part of the seal member 5. The other of the mold dies 15, 16 may include an annular cavity segment 18 designed to form an outer side part of the seal member 5. These two mold dies 15, 16 may mate with each other to create a cavity 19 in which the seal member 5 may be molded. The seal production mold 14 may include a first gate 20a that may be adjacent to an outer periphery of the cavity 19 and may also include a second gate 20b that may be adjacent to an inner periphery of the cavity 19. Materials to form the lastic member(s) 7 may be introduced through the first and second gates 20a, 20b into the cavity 19.

The protrusion portion 12 of the seal lip segment 9 may include the high wear rubber material, while the rest portion of the elastic member 7 may include rubber material. Such a configuration of the elastic member 7 may be produced by, for example, a double-molding technique with the seal production mold 14. More specifically, firstly, rubber material(s) may be introduced through the first gate 20a that is adjacent to an outer periphery of the cavity 19, to carry out primary molding of the aforementioned rest portion of the elastic member 7. Subsequently, high wear rubber material(s) may be introduced through the second gate 20b that is adjacent to an inner periphery of the cavity 19, to carry out secondary molding of the protrusion portion 12 of the seal lip segment 9. In a variant, firstly, high wear rubber material(s) may be introduced through the second gate 20b that is adjacent to an inner periphery of the cavity 19 to carry out molding of the protrusion portion 12, and subsequently, rubber material(s) may be introduced through the first gate 20a that is adjacent to an outer periphery of the cavity 19 to carry out molding of the rest portion of the elastic member 7—that is, the elastic member 7 except for the protrusion portion 12 that is already molded. In any case, a single seal production mold 14 may be used to mold the protrusion portion 12 that may include high wear rubber material(s) as well as the rest portion of the elastic member 7 that may include rubber material, such that they are integrally molded with each other.

Figure 3A:
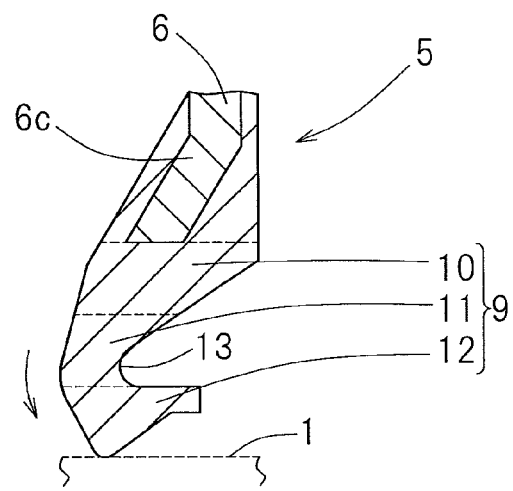
FIG. 3A is a vertical cross sectional view showing a relevant region on enlarged scale, illustrating how the seal lip segment may be in contact with an inner raceway ring.
Figure 3B:
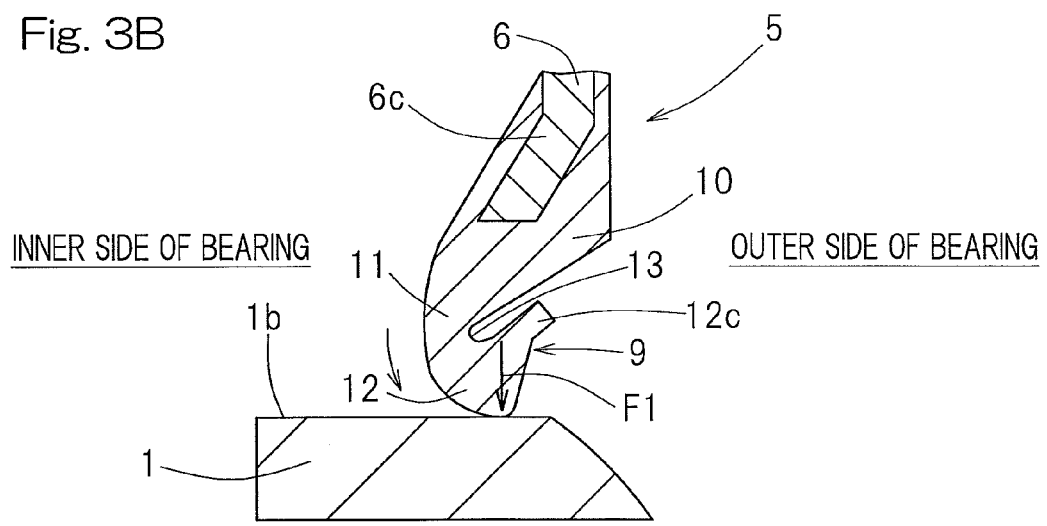
FIG. 3B is a vertical cross sectional view showing a relevant region on enlarged scale, illustrating how the wear of a protrusion portion of the seal lip segment may take place during rotation in the bearing assembly.
Figure 3C:
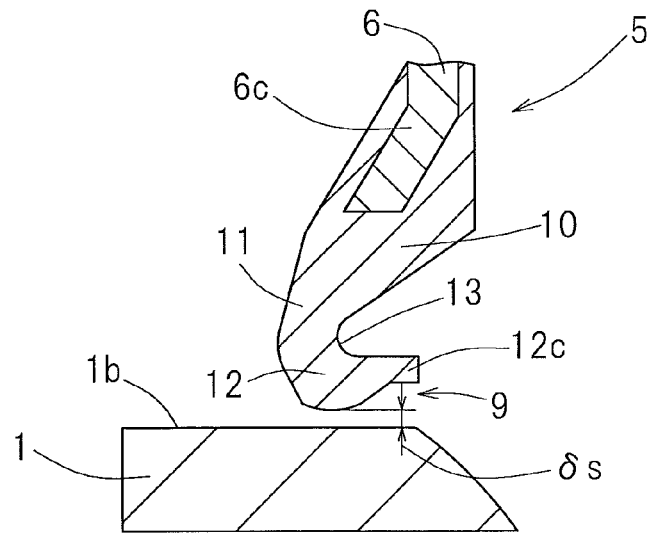
FIG. 3C is a vertical cross sectional view showing a relevant region on enlarged scale, illustrating how the wear on the seal lip segment may result in the creation of a labyrinth gap.

The following advantage(s) or effect(s) may be obtained. With the aforementioned configuration, the seal member 5 that is initially a contact-type seal member such as shown in FIG. 3B will be worn during operation, and within tens of minutes or so, the seal member 5 will turn into a non-contact type or light-contact type seal member such as shown in FIG. 3C. More specifically, rotation in the bearing assembly will result in wear of the protrusion portion 12 of the seal lip segment 9. As the wear of the protrusion portion 12 progresses during operation, the degree of interference of the protrusion portion 12 with the inner raceway ring 1 may change. The aforementioned seal member 5, however, may catch up with the change in the degree of that interference and apply a substantially constant urging force F1 in a radial direction against the inner raceway ring 1, as illustrated in FIG. 3B.

Figure 5:
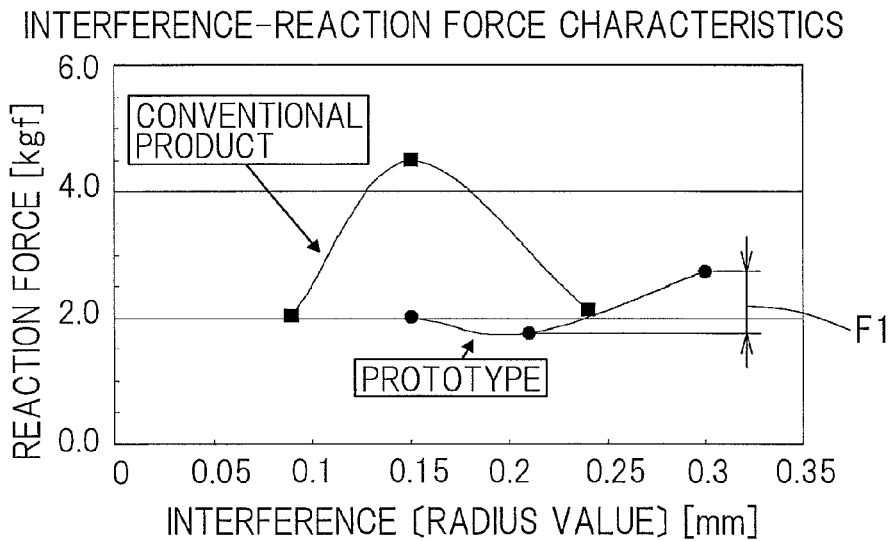
FIG. 5 is a graph of results (i.e. relationship between the degree of interference and the magnitude of reaction force) of seal wear evaluation test for a prototype according to the present invention and for a conventional product.

FIG. 5 is a graph of results of seal wear evaluation test for a rolling contact bearing assembly which includes a seal member according to the embodiment under discussion (hereinafter referred to as a "prototype") and for a conventional product (i.e. relationship between the degree of interference and the magnitude of reaction force). In the figure, the dots indicate the performance of the prototype and the squares indicate the performance of the conventional product. The horizontal axis represents the radius value (mm) of the interference. With respect to the conventional product, the reaction force against an inner raceway ring 1 ranged from 2.0 to 4.5 kgf as the degree of the interference of the conventional product with the inner raceway ring 1 changed from 0.24 to 0.09 mm. On the other hand, with respect to the prototype, the reaction force against an inner raceway ring 1 ranged from 1.75 to 2.75 kgf—a narrower range of variation than that of the conventional product—as the degree of the interference of the conventional product with the inner raceway ring 1 changed from 0.30 to 0.15 mm.

As the wear of a protrusion portion 12 progresses during operation, the degree of interference of the protrusion portion 12 with an inner raceway ring 1 may change. The aforementioned seal member 5, however, may catch up with the change in the degree of that interference and apply a substantially constant urging force F1 (as exemplified in FIG. 5) against the inner raceway ring 1. This may enable the protrusion portion 12 of the seal lip segment 9 to quickly but reliably wear at the physical contact of the protrusion portion 12 against the inner raceway ring 1. In this way, as shown in FIG. 3C, an optimized small gap (e.g. labyrinth gap δs) may be created between the seal lip segment 9 and the inner raceway ring 1.

Further, the seal lip segment 9 has a bent V-shape at a radially intermediate area of the seal lip segment 9. This may, even as the wear of the protrusion portion 12 progresses during operation of the bearing assembly, allow the seal lip segment 9 to maintain a substantially constant conformation while also keeping a substantially constant urging force against the inner raceway ring 1. More specifically, the seal member 5 may be installed to the bearing assembly such that a seal lip segment 9 which acts as a spring that flexes at a waist portion 11 thereof, such as shown in FIG. 3A, to urge a lip tip area—an area that may be defined by a protrusion portion 12 of the seal lip segment 9—on the inner raceway ring 1 with a contact pressure that enables the wear of the lip tip area. As shown in FIG. 3B, as the inner raceway ring 1 rotates and the wear of the protrusion portion 12 progresses, the flex at the waist portion 11 may catch up with the progression of the wear of the protrusion portion 12 by being biased to return to its original state or shape before installation of the seal member to the bearing assembly. This may ensure that the wear of the protrusion portion 12 progresses in a continuous manner. Then, the reaction force to urge the seal lip segment 9 to the inner raceway ring 1 may approaches "zero." In this way, as shown in FIG. 3C, the wear process of the seal lip segment 9 is completed, and an optimized labyrinth gap δs may be created.

Such a labyrinth gap δs formed in this way may have the following effects or advantages:

(1) Sealing torque may be reduced.
(2) Possible temperature rise by the self-heating of the bearing assembly may be suppressed, as compared with a conventional product.
(3) Such suppression of possible temperature rise by the self-heating of the bearing assembly may allow for the use of oil with a viscosity lower than those of conventionally used oils.
(4) The total loss in a transmission may be reduced.
(5) With such a labyrinth gap δs, contaminant particles with larger diameters that may undesirably affect the service life of the bearing assembly may be prevented from entering the inside of the bearing assembly.

Figure 6:
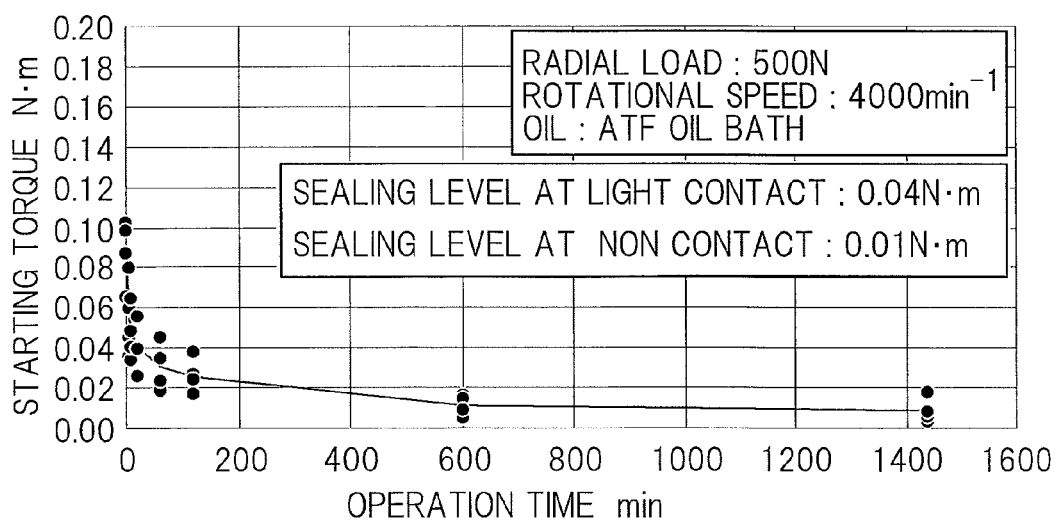
FIG. 6 is a graph illustrating the starting torque of such prototypes at a different points of time since the start of the operation of the prototypes.

FIG. 6 is a graph illustrating the starting torque of prototypes at different points of time since the start of the operation of the prototypes. The following results were obtained from seal wear evaluation test for a plurality of prototypes, each being a deep groove ball bearing assembly (bearing number: 6207) that included a seal member according to the embodiment under discussion. The test conditions included: (i) radial load: 500N; (n) rotational speed: 4,000 min$^{-1}$; and (iii) oil: oil bath of automatic transmission fluid (acronym: ATF oil bath). Furthermore, the level of sealing torque was assumed to be 0.04 N·m when a protrusion portion 12 of a seal member 5 is worn to such an extent that the protrusion portion 12 is in light contact with a surface, with such a light contact being defined as contact with a contact pressure that is substantially zero. The level of sealing torque was also assumed to be 0.01 N·m when a protrusion portion 12 of a seal member 5 is worn to such an extent that the protrusion portion 12 is no longer in contact with a surface. The starting torque was measured for each of the prototypes at predefined points of time after the test had started—in other words, after the operation of the corresponding one of the prototypes had started. As a result, within tens of minutes or so after the start of operation, the sealing torque for most of the prototypes was at least reduced down to a level where there is a light contact with a surface. This shows that sealing torque may advantageously be reduced.

How the seal lip segment 9 may maintain a substantially constant conformation will now be described. Referring to FIG. 2B, the seal lip segment 9 may have, as viewed in a cross section, a bent V-shape at a waist portion 11 thereof which may form a radially intermediate area of the seal lip segment 9, such that a surface of the seal lip segment 9 facing an outer side of the bearing space defines a relief recess 13. Thus, when the seal member 5 is being installed to a bearing assembly, the seal lip segment 9 is elastically deformed along a direction of the installation of the seal member 5 to the bearing assembly. Due to such a manner of installation of the seal member 5 to a bearing assembly, the seal lip segment 9 may be more likely to flex towards an outer side of the bearing space, thus making it more difficult for the seal lip segment 9 to undesirably flex in the opposite direction.

How a substantially constant reaction force may be generated in the seal lip segment 9 will now be described. The seal lip segment 9 may be shaped or configured such that it acts as a spring that flexes at the waist portion 11. Such a shape or configuration may allow generation of a reaction force in the protrusion portion 12 of the seal lip segment 9, which has a magnitude appropriate to enable the wear of the protrusion portion 12. Even as the wear of the protrusion portion 12 progresses during operation of the bearing assembly, the flex at the waist portion 11 may catch up with the progression of the wear of the protrusion portion 12 by being biased to elastically return to its original state or shape before installation of the seal member to the bearing assembly. This may prevent sudden reduction of the seal lip reaction force. Further, the provision of the relief recess 13 such as shown in FIG. 2B may result in the seal lip segment 9 having such rigidity that the flex of seal lip segment 9 at the waist portion 11 does not generate an excessive reaction force that may act to the site of physical contact between the seal lip segment 9 and the inner raceway ring 1. Referring to FIG. 2A, such a configuration may prevent possible slip between one end of the seal member 5 which is a proximal end to the outer raceway ring 2—that is, the base end of the seal member body 8—and the seal mount groove 2b that may be formed in the outer raceway ring, thus preventing such slip from hindering wear of the seal lip segment 9.

As can be seen from the foregoing discussion, the seal lip segment 9 may be configured to perform a certain elastic performance similar to that of a spring. Such a configuration may result in a substantially constant seal lip reaction force acting against the inner raceway ring 1, regardless of the degree of interference of the seal lip segment 9 with the inner raceway ring 1. This may prevent, even as the wear of the protrusion portion 12 progresses, sudden reduction of the seal lip reaction force. Further, the seal lip segment 9 in its entirety may be designed not to have excessive rigidity. This may prevent generation and application of an excessive seal lip reaction force. In this way, the seal member 5 may be adequately and reliably worn regardless of the degree of interference of the seal lip segment 9, thus achieving reduction of a sealing torque while at the same time providing improved contaminants-blocking performance.

Referring to FIG. 2A, the elastic member 7 may cover an entirety of the metal core 6—in the example under discussion, an entirety of the metal core 6 except an inner side surface of the upright segment 6b of the metal core 6. In this case, a part of the elastic member 7 at the base end of the seal member body 8 may be secured, while being elastically deformed, into the seal mount groove 2b formed in the outer raceway ring 2.

Such a configuration may establish more improved sealing between the outer raceway ring 2 and the base end of the seal member body 8.

Figure 7A:
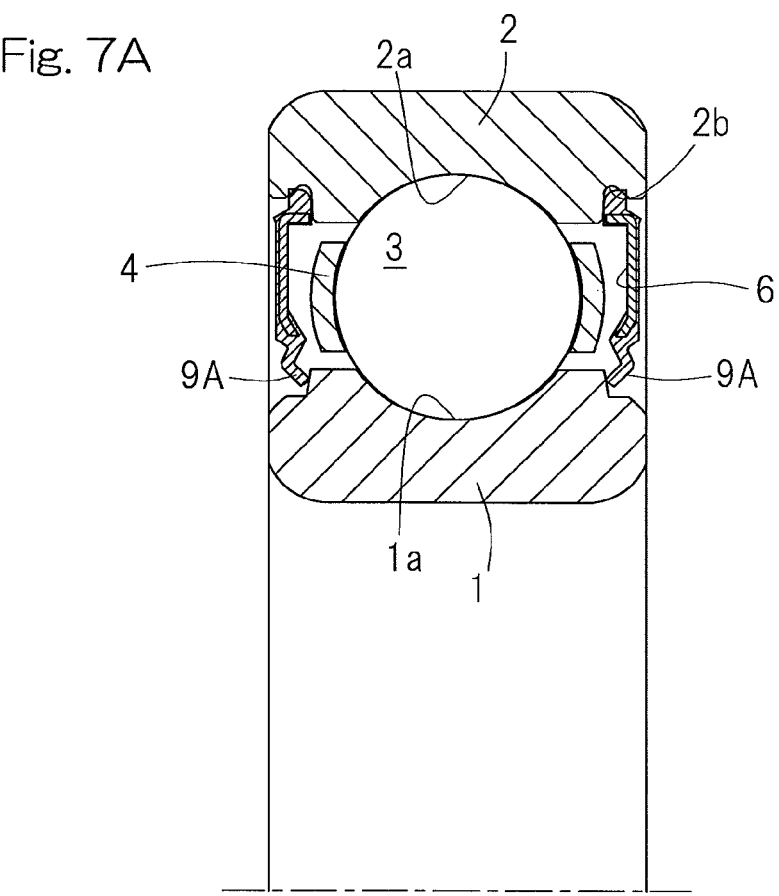
FIG. 7A is a vertical cross sectional view of a rolling contact bearing assembly according to the second embodiment of the present invention.
Figure 7B:
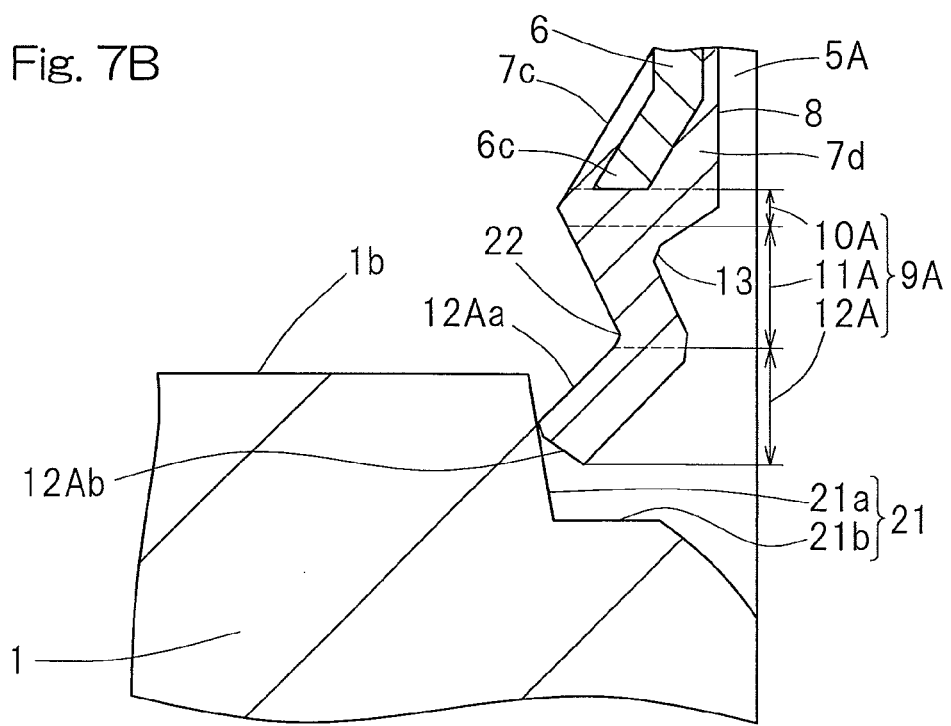
FIG. 7B is an enlarged cross sectional view of a seal member installed to the bearing assembly at a seal lip segment of the seal member.

Referring to FIG. 7A which shows a rolling contact bearing assembly according to the second embodiment, the seal lip segment 9A may be shaped to axially contact the inner raceway ring 1. As shown on enlarged scale in FIG. 7B, in the example under discussion, a peripheral surface of the inner raceway ring 1 facing the bearing space—in other words, an outer peripheral surface 1b of the inner raceway ring 1—may include a seal groove 21. The seal groove 21 may include a diagonally extending surface 21a that may be continuous with an outer diameter surface of the inner raceway ring and may include a groove bottom surface 21b that may be continuous with the diagonally extending surface 21a. The diagonally extending surface 21a may be shaped to be inclined axially outwardly in a direction from the outer diametric side to the inner diametric side. The protrusion portion 12A—which will be discussed later in detail—of the seal lip segment 9A may axially contact the diagonally extending surface 21a.

The lip base end area 10A of the seal lip segment 9A of the seal member 5A may have, as viewed in a cross section, a shape having a thickness that reduces towards an inner diameter end or a tip end of the seal lip base end portion 10A. The seal lip base end portion 10A has an inner side surface facing an inner side of the bearing space and also has an outer side surface. The inner side surface of the seal lip base end portion 10A may be inclined axially outwardly towards radially inwardly. The outer side surface of the seal lip base end portion 10A may be inclined axially inwardly towards radially inwardly. The seal lip segment 9A may have, as viewed in a cross section, a bent V-shape at the waist portion 11A—in particular, a bent V-shape defined by the combination of the seal lip base end portion 10A and waist portion 11A—such that a surface of the seal lip segment 9A facing an outer side of the bearing space defines a relief recess 13. The seal lip segment 9A may also have, as viewed in a cross section, an additional bent V-shape inversely oriented with respect to the aforementioned bent V-shape, which may be defined by the combination of the waist portion 11A and the protrusion portion 12A, such that a surface of the seal lip segment 9A facing an inner side of the bearing space defines an additional recess 22. The protrusion portion 12A may be inclined axially inwardly towards radially inwardly. The protrusion portion 12A has an inner side surface 12Aa facing an inner side of the bearing space and also has a bottom surface 12Ab. The inner side surface 12Aa and the bottom surface 12Ab cooparatively define a corner of intersection therebetween. Such a corner may axially contact the diagonally extending surface 21a of the seal groove 21 in the inner raceway ring.

With such a configuration, the seal member 5A may be installed to the bearing assembly such that a seal lip segment 9A which acts as a spring that flexes at a waist portion 11A thereof, to urge a lip tip area—an area that may be defined by a protrusion portion 12A of the seal lip segment 9A—to the inner raceway ring 1 with a contact pressure that enables the wear of the lip tip area. As the inner raceway ring 1 rotates and the wear of the protrusion portion 12A progresses, the flex at the waist portion 11A may catch up with the progression of the wear of the protrusion portion 12A by being biased to return to its original state or shape before installation of the seal member to the bearing assembly. This may ensure that the wear of the protrusion portion 12A progresses in a continuous manner. Then, the reaction force to urge the seal lip segment 9A to the inner raceway ring 1 may approach "zero." In this way, the wear process of the seal lip segment 9A is completed, and an optimized labyrinth gap may be created. Such a labyrinth gap created in this way may have effects or advantages that are similar to the effects or advantages (1) to (5) mentioned in connection with the first embodiment.

Figure 8:
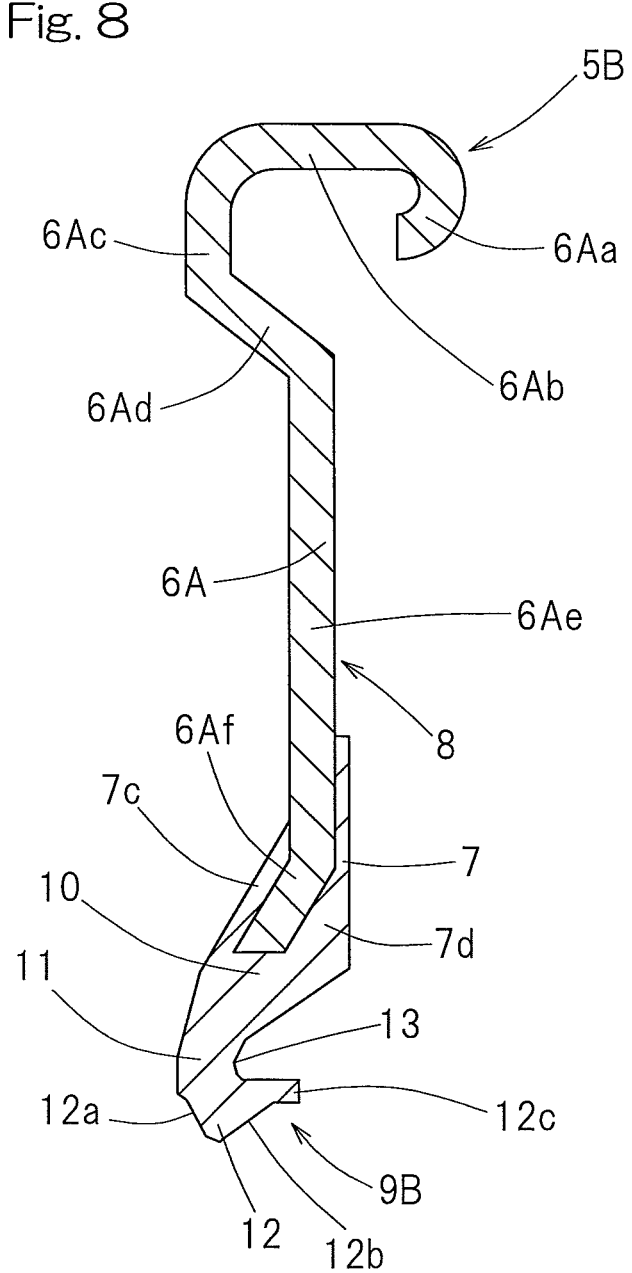
FIG. 8 is a vertical cross sectional view of a rolling contact bearing assembly according to the third embodiment of the present invention.

Referring to FIG. 8 which shows a rolling contact bearing assembly according to the third embodiment, the seal member 5B may include a metal core 6A and elastic member 7, and the elastic member 7 may cover a part of the metal core 6A. The metal core 6A may be made of steel sheet metal. The metal core 6A may include a bent-formed segment 6Aa, a cylindrical segment 6Ab, a first upright segment 6Ac, a first diagonally extending segment 6Ad, a second upright segment 6Ae, and a second diagonally extending segment 6Af. The elastic member 7 may cover a radially inward side of the second upright segment 6Ae as well as the second diagonally extending segment 6Af. The bent-formed segment 6Aa and the cylindrical segment 6Ab may be crimpedly secured into the seal mount groove 2b (FIG. 2A) that may be formed in the outer raceway ring 2. The rest of the features in the third embodiment may be similar to the corresponding features in the first embodiment. With such a configuration, the seal member 5B may acquire increased rigidity. For example, the seal member 5B may acquire greater rigidity as compared with a seal member that includes elastic member covering an entirety of a metal core of the seal member. In this way, such a configuration may more reliably ensure that an urging force is applied against the inner raceway ring 1. The seal lip segment 9B of the seal member 5B may have any one of the configurations that are discussed in connection with the preceding embodiments.

Although in the preceding embodiments it is assumed that the bearing assembly is an inner ring rotating type, bearing assembly, the bearing assembly may include an outer raceway ring as a rotational raceway ring, thus constituting an outer ring rotating type, bearing assembly. In the latter case, a lip tip end that may be defined by a free end of the protrusion portion may not form a protrusion on an inner peripheral edge of the protrusion portion but on an outer peripheral edge of the protrusion portion. The lip tip end may be in slidingly contact with an inner peripheral surface of the outer raceway ring.

Figure 9:
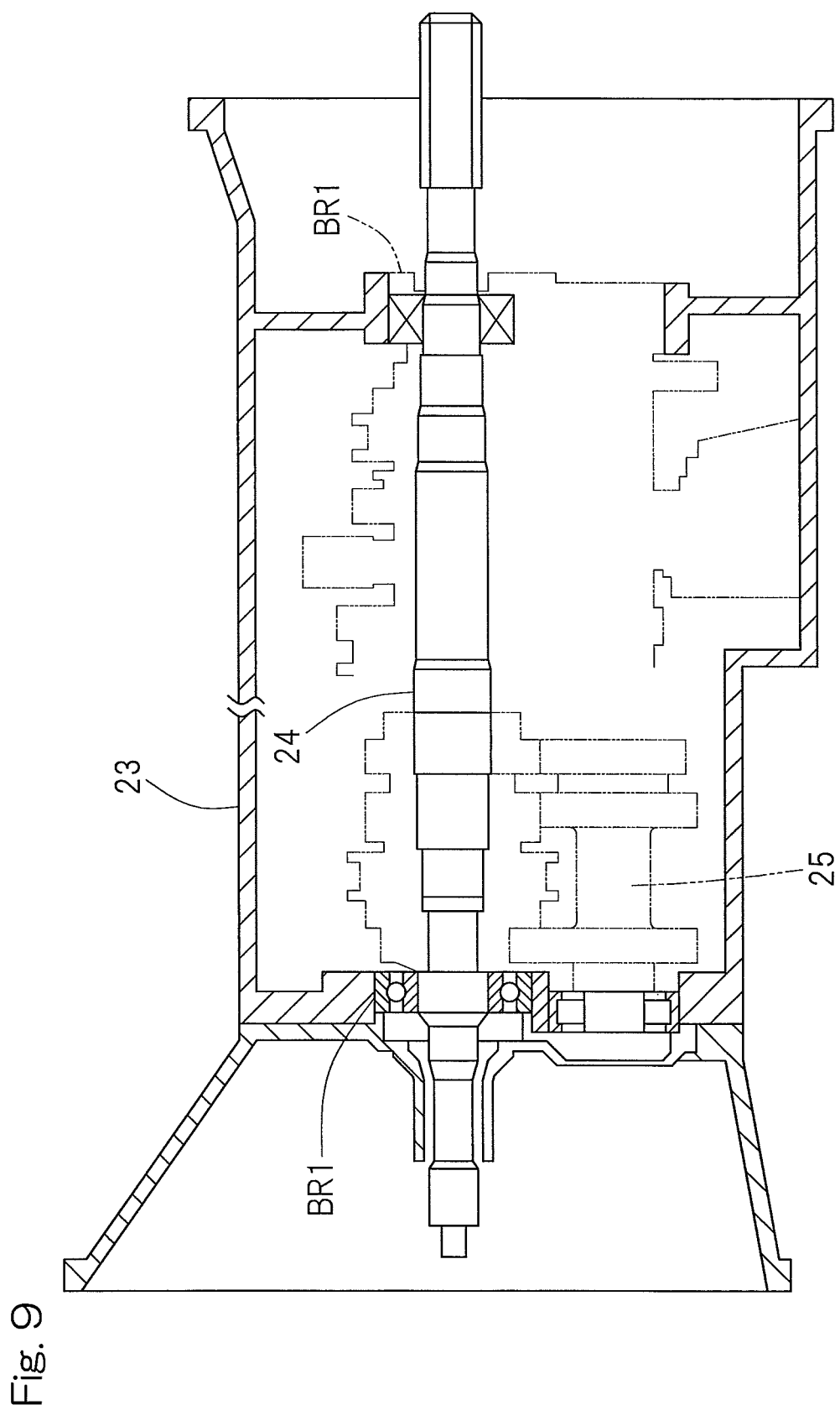
FIG. 9 is a schematic, longitudinal cross sectional view of an exemplary application where a rolling contact bearing assembly according to one of the preceding embodiments is employed in a vehicle transmission.

FIG. 9 schematically shows an exemplary application where a rolling contact bearing assembly according to one of the preceding embodiments is incorporated into a vehicle transmission. The vehicle transmission shown therein is an automatic transmission. The vehicle transmission may include a casing 23 having axially opposite ends and a main shaft 24. The vehicle transmission may include rolling contact bearing assemblies BR1, BR1 mounted to the casing 23, each having a configuration in accordance with any one of the preceding embodiments. The rolling contact bearing assemblies BR1, BR1 may be mounted to the casing 23 such that an outer raceway ring of each one of the rolling contact bearing assemblies BR1, BR1 is fitted to a corresponding one of the axially opposite ends of the casing 23 and such that the rolling contact bearing assemblies BR1, BR1 rotatably support the main shaft 24 at opposite ends of the main shaft 24 via an inner raceway ring of each one of the rolling contact bearing assemblies BR1, BR1. The casing 23 is provided with a countershaft 25 disposed in parallel with the main shaft 24. The main shaft 24 may include gears, and the countershaft 25 includes gears configured to engage the gears of the main shaft 24, and is rotatably supported by the casing 23 via another bearing assembly/assemblies.

As just discussed, rolling contact bearing assembly/assemblies BR1, BR1 according to any one of the preceding embodiments may be incorporated into a vehicle transmission. Such rolling contact bearing assembly/assemblies BR1, BR1 may effectively prevent possible contaminants in the transmission, such as wear debris from gears, from entering the inside of the bearing assembly/assemblies BR1, BR1. Further, in each of the rolling contact bearing assembly/assemblies BR1, BR1, a seal member may be adequately and reliably worn regardless of the degree of interference of a seal lip segment of the seal member, thus achieving reduction of a sealing torque. Such reduction or even elimination of a sealing torque may improve the fuel economy of a vehicle equipped with such a vehicle transmission. A rolling contact bearing assembly according to any one of embodiments of the present invention may be employed in or for a continuously variable transmission and/or a manual transmission.

Next, the fourth embodiment and fifth embodiment of the present invention will be described in connection with FIG. 10 to FIG. 15. Reduction of a sealing torque in a conventional product—in particular, a sealed bearing assembly such as disclosed in the Patent Document 1 mentioned earlier—may be still limited and unsatisfactory. A sealed bearing assembly with a non-contact seal may achieve sealing torque that is virtually zero. In such a case, however, it may be difficult to properly create, between a non-contact seal and a surface, a seal gap with such a small clearance that adequately blocks possible contaminants from passing through the seal gap, due to assembly errors, manufacturing errors, thermal expansion differences, etc.

The Applicant has proposed a technique in which a gap formation facilitating element for facilitating a wear of a forefront portion of a sealing lip may be provided in a sealing face of a raceway ring with which the sealing lip contacts slidingly (see JP Laid-open Patent Publication No. 2010-112472). In particular, the provision of such a gap formation facilitating element may result in conversion of a sealing member, which is a contact type at the initial stage of operation into a sealing member of a non-contact type after, for example, a few minutes subsequent to the start of operation, as a result of a sliding contact with the gap formation facilitating element. However, it may be more desirable to enable a seal member to be more quickly worn, thus achieving reduction of a sealing torque more quickly. Furthermore, with such a sealed bearing assembly with a non-contact bearing assembly as disclosed in JP Laid-open Patent Publication No. 2010-112472, a deburring treatment of a seal lip slidingly movable portion after a seal molding process may be necessary. This may lead to increased production cost.

In accordance with the fourth and fifth embodiments which will be hereinafter described in detail, possible contaminants may be more reliably prevented from entering the inside of a bearing assembly while also achieving reduction of a sealing torque more quickly after the start of operation of the bearing assembly, as compared with a conventional product. In the following discussion of the fourth and fifth embodiments in connection with FIG. 10 to FIG. 15, those features that are the same as or equivalent to the corresponding features in the first embodiment of the present invention that is described in connection with FIG. 1 to FIG. 6 will be indicated by the same reference signs and the detailed discussion of those features will be omitted to avoid redundancy.

Figure 10:
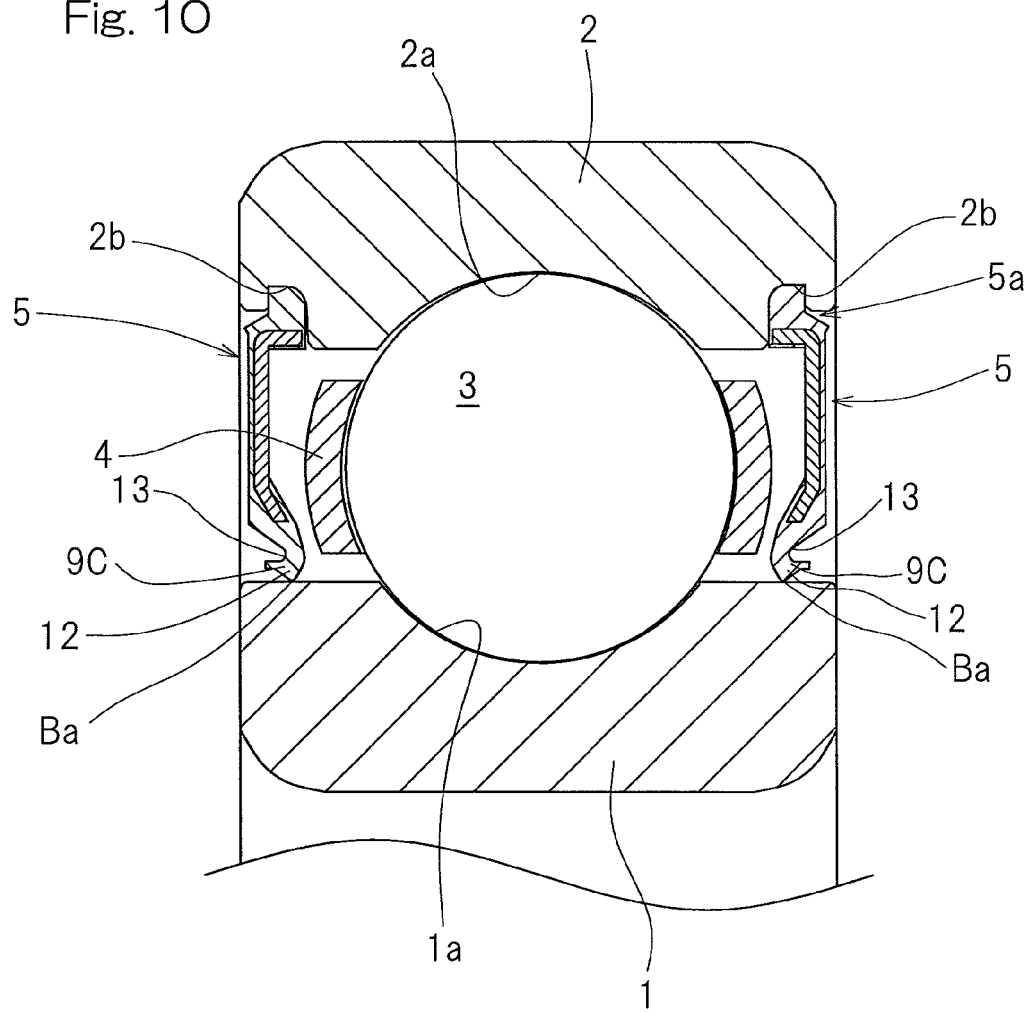
FIG. 10 is a vertical cross sectional view of a sealed bearing assembly according to the fourth embodiment of the present invention.

Referring to FIG. 10, in the fourth embodiment, a lip tip end that may be defined by a free end of a protrusion portion 12 of a seal lip segment 9C may include a burr Ba. Possible configurations for the relief recess, the waist portion for the aforementioned V shape, the protrusion portion and the tapered shape in the fourth embodiment will be briefly discussed below.

Figure 11A:
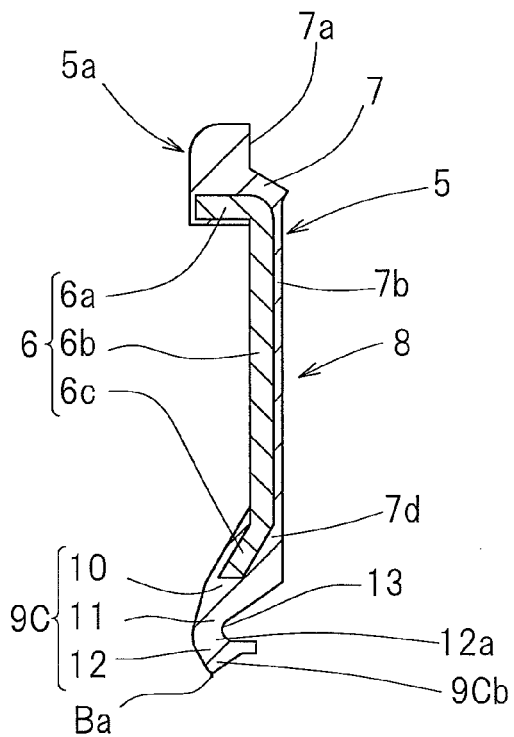
FIG. 11A is a cross sectional view of a seal member for the bearing assembly.
Figure 11B:
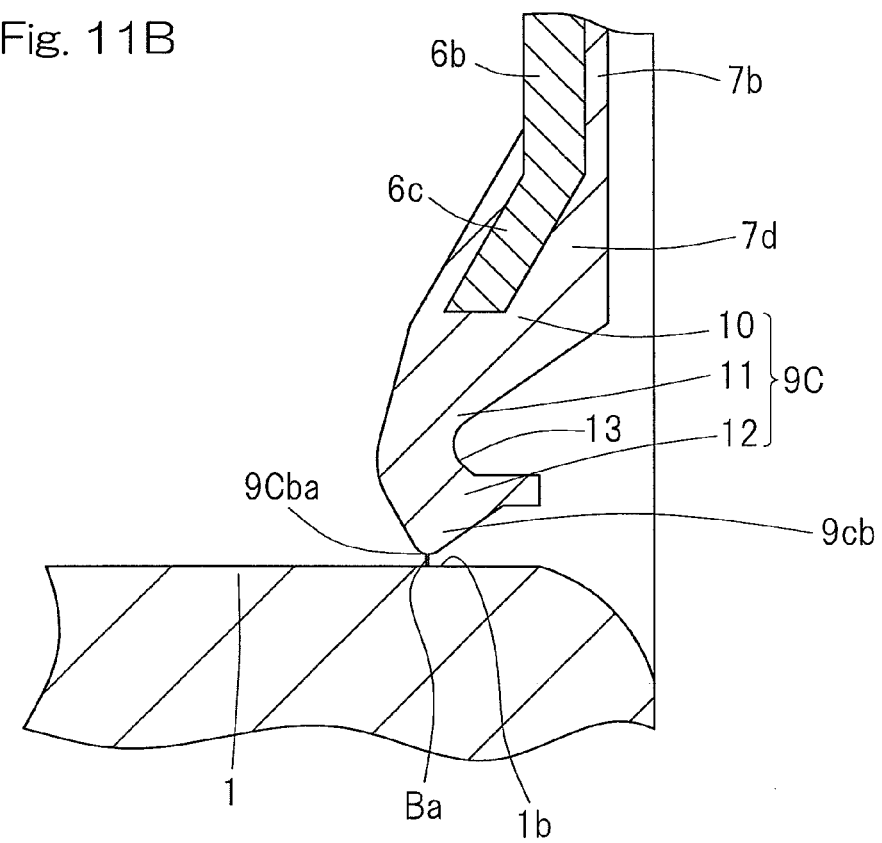
FIG. 11B is a cross sectional view showing a relevant region at the seal member on enlarged scale.

Referring to FIG. 11A, the seal lip segment 9C may include, starting from a radially outward side of the seal lip segment 9C, a seal lip base end portion 10, a waist portion 11, a protrusion portion 12 and a seal lip slidingly movable portion 9Cb that protrudes from an inner peripheral edge of the protrusion portion 12 to be in slidingly contact with the inner raceway ring 1, in this order. The seal lip base end portion 10, the waist portion 11, the protrusion portion 12 and the seal lip slidingly movable portion 9Cb may be formed integrally with each other or in one-piece construction. A lip tip end 9Cba that may be defined by a free end of the seal lip slidingly movable portion 9Cb may include a burr Ba. The burr Ba may be in sliding contact—in particular, radial contact—with an outer peripheral surface 1b of the inner raceway ring 1. As is the case with the first embodiment, a bearing assembly may include an outer raceway ring as a rotational raceway ring, thus constituting an outer ring rotating type, bearing assembly. In such a case, the seal lip slidingly movable portion may form a protrusion not on an inner peripheral edge of the protrusion portion but on an outer peripheral edge of the protrusion portion. A lip tip end at the seal lip slidingly movable portion may include the aforementioned burr that is in slidingly contact with an inner peripheral surface of the outer raceway ring.

Figure 12A:
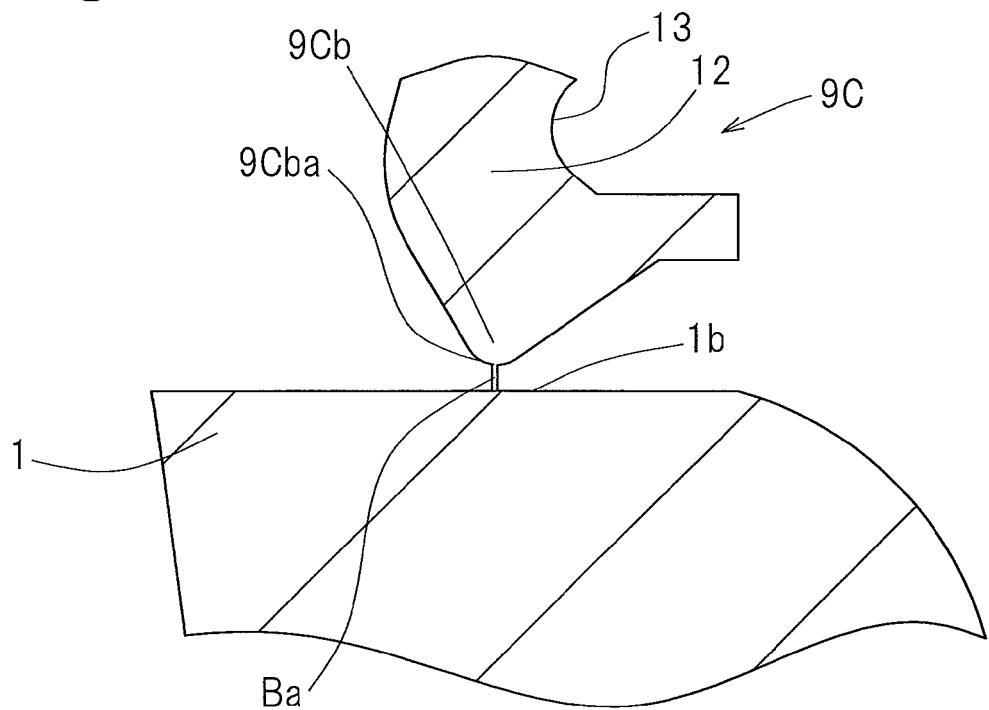
FIG. 12A is an enlarged cross sectional view illustrating how a seal lip slidingly movable portion of the seal member may be in contact with an inner raceway ring before the wear of the seal lip slidingly movable portion starts.
Figure 12B:
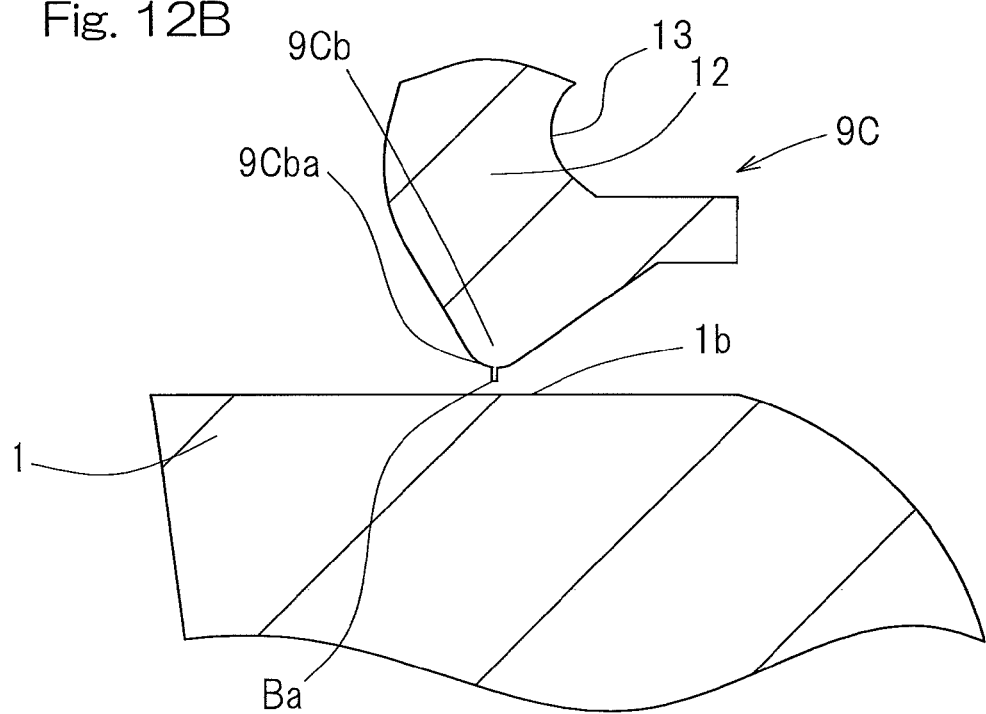
FIG. 12B is an enlarged cross sectional view illustrating how the wear of a lip tip end at the seal lip slidingly movable portion may result in the creation of an optimized small gap.

The seal lip slidingly movable portion 9Cb may correspond to an area molded at a parting line PL of a seal production mold 14A (FIG. 13) that may mold the seal member 5 in such a way that a lip tip end 9Cba at the seal lip slidingly movable portion 9Cb aligns with the parting line PL. As shown in FIG. 12A, the lip tip end 9Cba may include a burr Ba. The lip tip end 9Cba including the burr Ba may include such high wear material that rotation in the bearing assembly results in wear of the lip tip end 9Cba to cause the lip tip end 9Cba to be no longer in contact or to be in light contact with a surface, such as shown in FIG. 12B. In the example under discussion, only the seal lip slidingly movable portion 9Cb may include the high wear material. However, the present invention is not limited to such a configuration. For example, the seal lip slidingly movable portion 9Cb and the protrusion portion 12 or even more, an entirety of the seal lip segment 9C may include the high wear material. Examples of the high wear material that may be used in the fourth embodiment include those that are described in the discussion of the first embodiment.

Figure 13:
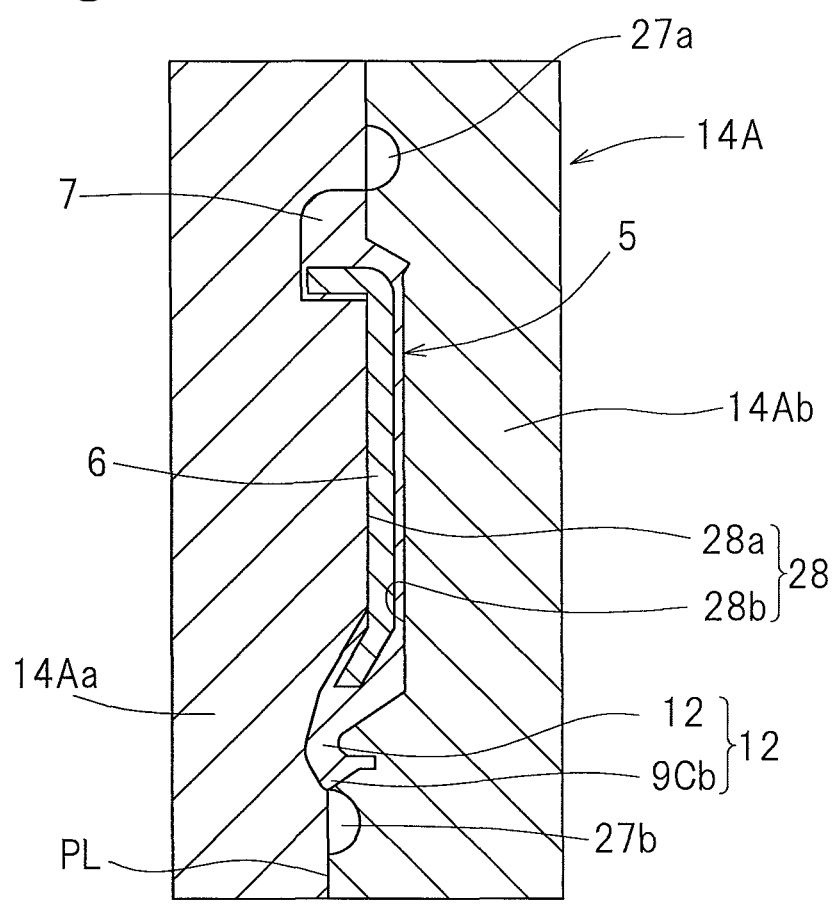
FIG. 13 is a vertical cross sectional view of a seal production mold that may mold the seal member.

FIG. 13 is a vertical cross sectional view of a seal production mold 14A that may mold the seal member 5. Referring to this figure, a seal production mold 14A that molds the seal member 5 may include two mold dies 14Aa, 14Ab that is configured to mate with each other. One of the mold dies 14Aa, 14Ab—say, the mold die 14Aa—may include an annular cavity segment 28a designed to form an inner side part of the seal member 5. The mold die 14Ab may include an annular cavity segment 28b designed to form an outer side part of the seal member 5. These two mold dies 14Aa, 14Ab may mate with each other to create a cavity 28 in which the seal member 5 may be mold. Mate faces of these two mold dies 14Aa, 14Ab may define the parting line PL. The seal production mold 14A may include an annular first gate 27a that may be adjacent to an outer periphery of the cavity 28 and may also include an annular second gate 27b that may be adjacent to an inner periphery of the cavity 28. Elastic member(s) 7 may be introduced through the first and second gates 27a, 27b into the cavity 28. For instance, a configuration where the seal production mold 14A includes an annular second gate 27b adjacent to an inner periphery of the cavity 28 may allow for intentionally but reliably configuring the lip tip end 9Cba to include a burr Ba.

The seal lip slidingly movable portion 9Cb that may include the high wear rubber material, together with the rest portion of the elastic member 7, may be produced by a double-molding technique with the seal production mold 14A. More specifically, firstly, elastic member(s) 7 may be introduced through the first gate 27a that may be adjacent to an outer periphery of the cavity 28, to carry out primary molding of the aforementioned rest portion of the elastic member 7—that is, except the seal lip slidingly movable portion 9Cb. Subsequently, high wear rubber material(s) may be introduced through the second gate 27b that may be adjacent to an inner periphery of the cavity 28, to carry out secondary molding of the seal lip slidingly movable portion 9Cb of the seal lip segment 9C. In this way, the high wear rubber material(s) and the elastic member(s) 7 may be integrally molded with each other. More specifically, a single seal production mold 14A may be used to mold the seal lip slidingly movable portion 9Cb that may be secondarily molded as well as the rest portion of the elastic member 7, such that they are integrally molded with each other.

In a sealed bearing assembly having any one of the aforementioned configurations, the seal member 5 that is initially a contact-type seal member will be worn during operation, and the seal member 5 will quickly turn into a non-contact type or light-contact type seal member. More specifically, the seal lip slidingly movable portion 9Cb of the seal lip segment 9C will be worn in a way that reduction or elimination of a sealing torque will be quickly and sufficiently achieved. Also, the tip lip end 9Cba at the seal lip slidingly movable portion 9Cb which may, when molded, align with a parting line PL of the seal production mold 14A may include a burr Ba, and the lip tip end 9Cba including the burr Ba will be worn. The burr Ba at the lip tip end 9Cba may define a starting point of the wear, thus facilitating the wear of the seal lip slidingly movable portion 9Cb. To cause a seal lip segment 9C to be quickly worn, a lip tip end 9Cba may need to include thinner portions. Molding such thinner portions, however, may be difficult and may result in reduced yield. In contrast, in the fourth embodiment under discussion, a beneficial use of "burr" Ba may be made, which may be an inevitable outcome of a molding process and which is, in principle, unwanted. Tiny little burr(s) Ba that may be present on the lip tip end 9Cba may have small contact surface area(s) against the inner raceway ring 1. In this way, such burr(s) Ba will be quickly ground away during operation of the bearing assembly. As such, a lip tip end 9Cba may be worn more quickly than a conventional product, thus facilitating reduction or elimination of a sealing torque.

Also, the seal lip slidingly movable portion 9Cb may be configured such that rotation in the bearing assembly results in wear of only the burr Ba. In this case, since portions other than the burr Ba which has sliding contact surfaces may avoid being worn, a lip tip end 9Cba may be worn more quickly than a conventional product. Further, a deburring treatment of the seal lip slidingly movable portion 9Cb after a seal molding process may not be necessary. This may enable reduction of the number of processing steps, which may, in turn, enable reduction of production cost.

An outer periphery of the seal member 5 on an outer peripheral surface of the cylindrical segment 6a of the metal core 6, together with the cylindrical segment 6a itself, may form a base end of the seal member 5. The base end of the seal member 5 may form a mountable segment 7a of the seal member 5 that may be fittedly secured into the seal mount groove 2b that may be formed in the outer raceway ring 2. In such a configuration, the mountable segment 7a of the seal member 5 may be securely and firmly fitted into the seal mount groove 2b, thus further improving the wearability of the seal lip slidingly movable portion 9Cb. Only the seal lip slidingly movable portion 9Cb of the seal lip segment 9C may include the high wear material. In such a configuration, the protrusion portion 12 of the seal lip segment 9C and/or other portions of the seal member 5 may be made of materials generally used, thus enabling reduction of material cost.

Figure 14A:
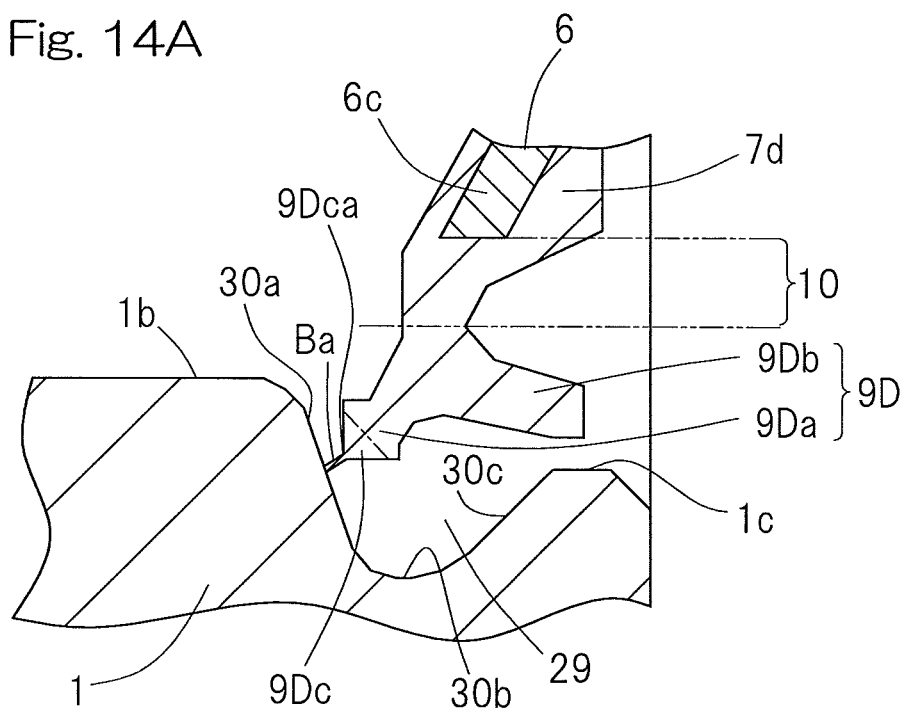
FIG. 14A is a vertical cross sectional view showing a relevant region on enlarged scale in a sealed baring assembly according to the fifth embodiment of the present invention.
Figure 14B:
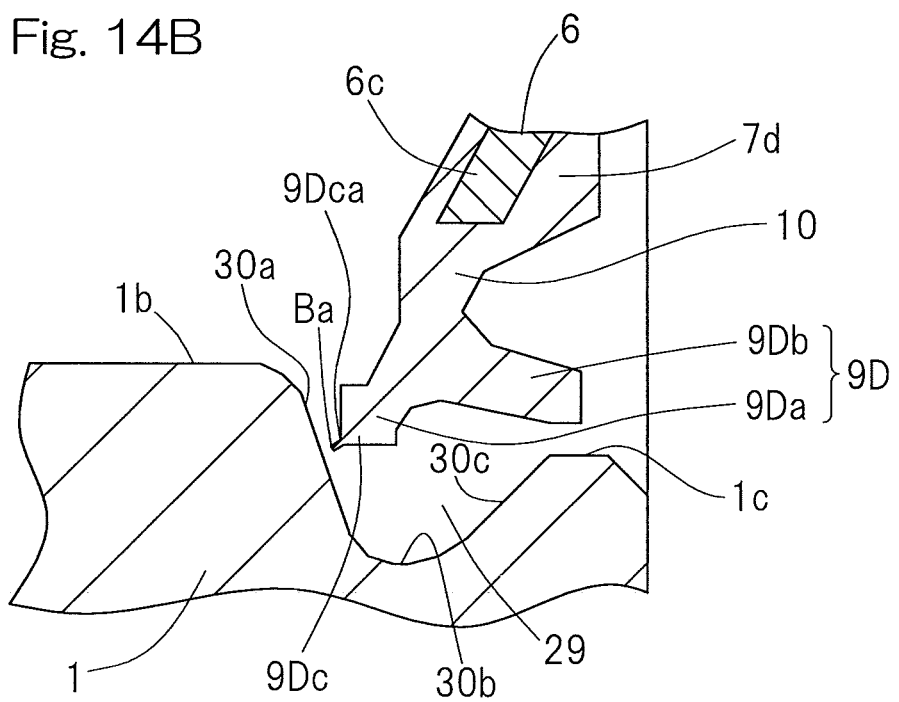
FIG. 14B is an enlarged cross sectional view illustrating how the wear of a seal lip slidingly movable portion of a seal member installed to the bearing assembly may result in the creation of an optimized small gap.

The fifth embodiment will now be described in connection with FIG. 14A, FIG. 14B and FIG. 15. In the fifth embodiment, the seal lip segment 9D may be shaped to axially contact the inner raceway ring 1—in particular, an outer peripheral surface 1b of the inner raceway ring 1. As shown in FIG. 14A and FIG. 14B, the inner raceway ring 1 may include, at a location thereof corresponding to an inner periphery of the seal member 5, a seal guide groove 29 that may include a circumferential groove. The seal guide groove 29 may include an inner side diagonally extending surface 30a that may be continuous with an outer peripheral surface 1b of the inner raceway ring 1. The seal guide groove 29 may include a groove bottom surface 30b that may be continuous with the inner side diagonally extending surface 30a. The seal guide groove 29 may include an outer side diagonally extending surface 30c that may be continuous with the groove bottom surface 30b. The inner raceway ring 1 may include an inner raceway ring shoulder 1c that may adjoin the outer side diagonally extending surface 30c of the seal guide groove 29 in such a way to extend towards an outer side of the bearing space. The inner side diagonally extending surface 30a may be substantially flat. The inner side diagonally extending surface 30a may shaped to be inclined axially outwardly in a direction from the outer diametric side towards the inner diametric side. The outer side diagonally extending surface 30c may be shaped to be inclined axially outwardly in a direction from the inner diametric side towards the outer diametric side. The groove bottom surface 30b may be continuous with both a radially inward edge of the inner side diagonally extending surface 30a and a radially inward edge of the outer side diagonally extending surface 30c. The seal lip segment 9D, which will be discussed later in more detail, may axially contact the groove bottom surface 30b. The seal guide groove 29 may have, as viewed in a cross section thereof, a bent substantially V-shape that may be defined by the combination of the inner side diagonally extending surface 30a, the groove bottom surface 30b and the outer side diagonally extending surface 30c.

Referring to FIG. 14A, in the fifth embodiment under discussion, the seal lip segment 9D may be shaped to axially contact the inner raceway ring 1—in particular, the inner side diagonally extending surface 30a of the seal guide groove 29. More specifically, the seal lip segment 9D in the example under discussion may include an inner side seal lip subsegment 9Da and an outer side seal lip subsegment 9Db. The inner side seal lip subsegment 9Da may axially extend towards an inner side of the bearing space in a diagonal direction. In particular, the inner side seal lip subsegment 9Da may be situated deeper in an inner side of the bearing space at a more radially inward location of the subsegment 9Da. The outer side seal lip subsegment 9Db may axially extend towards an outer side of the bearing space in a diagonal direction. In particular, the outer side seal lip subsegment 9Db may be situated deeper in an outer side of the bearing space at a more radially inward location of the subsegment 9Db. The inner side seal lip subsegment 9Da has a free end that may axially contact the inner side diagonally extending surface 30a. The outer side seal lip subsegment 9Db has a free end that may confront the inner raceway ring shoulder 1c via a gap. In the example under discussion, only the seal lip slidingly movable portion 9Dc of the seal lip segment 9D, which may be defined by a free end of the inner side seal lip subsegment 9Da, may include the high wear material.

Referring to FIG. 14B, the seal lip slidingly movable portion 9Dc at the inner side seal lip subsegment 9Da, which initially constitutes a contact-type seal, will be worn during operation of the bearing assembly in such a way that reduction or elimination of a sealing torque will be quickly but sufficiently achieved. More specifically, the tip lip end 9Dca at the seal lip slidingly movable portion 9Dc which may, when molded, align with a parting line PL of the seal production mold 14B such as shown in FIG. 15 may include a tiny burr Ba (FIG. 14A). Rotation in the bearing assembly may result in wear of such a tiny burr Ba. In this way, as shown in FIG. 14B, a lip tip end 9Dca may be worn more quickly than a conventional product, thus facilitating reduction or elimination of a sealing torque. In the fifth embodiment of the present invention, additional effect(s) or advantage(s) may be obtained that is/are similar to the effect(s) or advantage(s) that may be obtained in the fourth embodiment.

Figure 15:
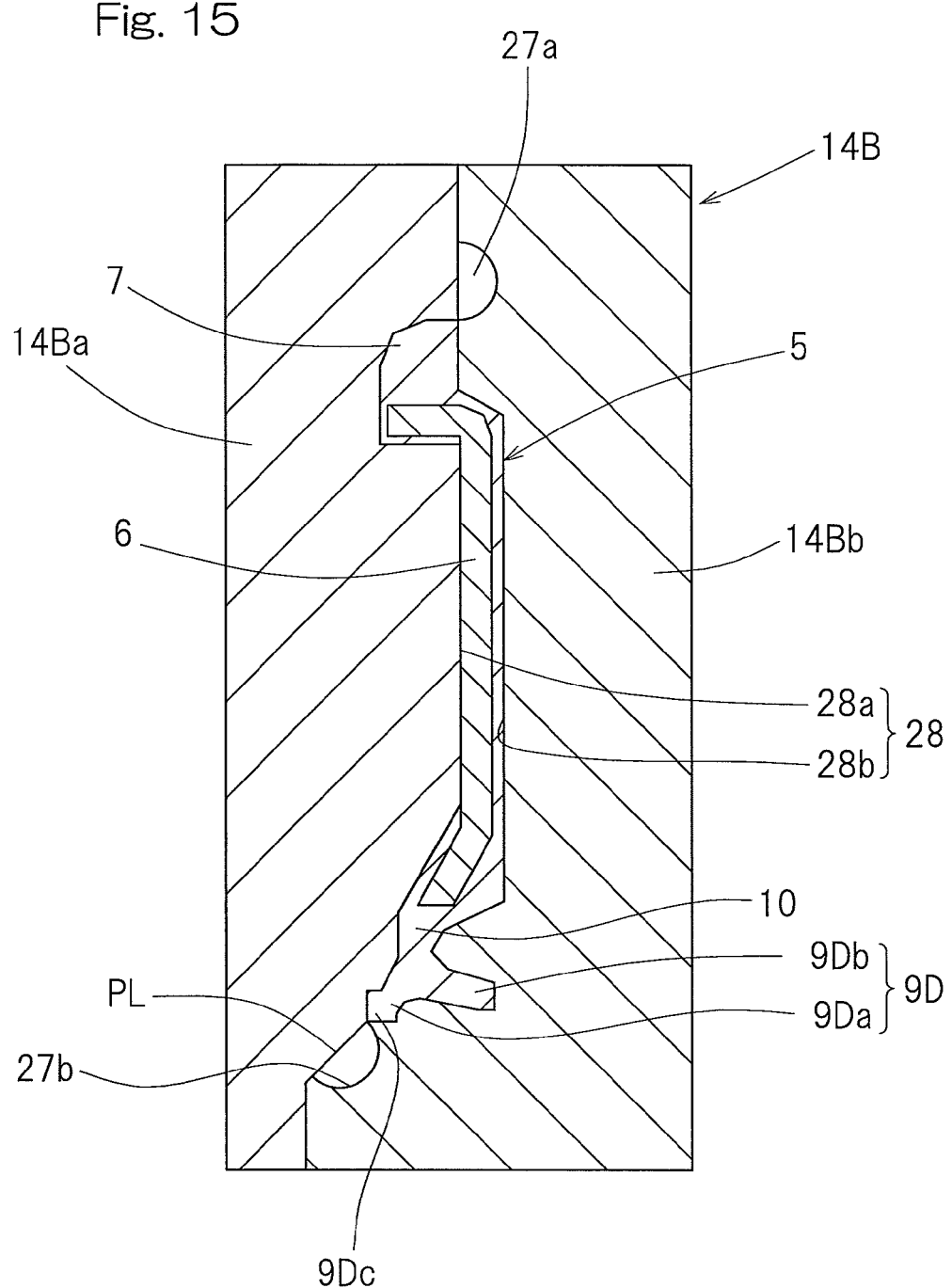
FIG. 15 is a vertical cross sectional view of a seal production mold that may mold the seal member.
Figure 16:
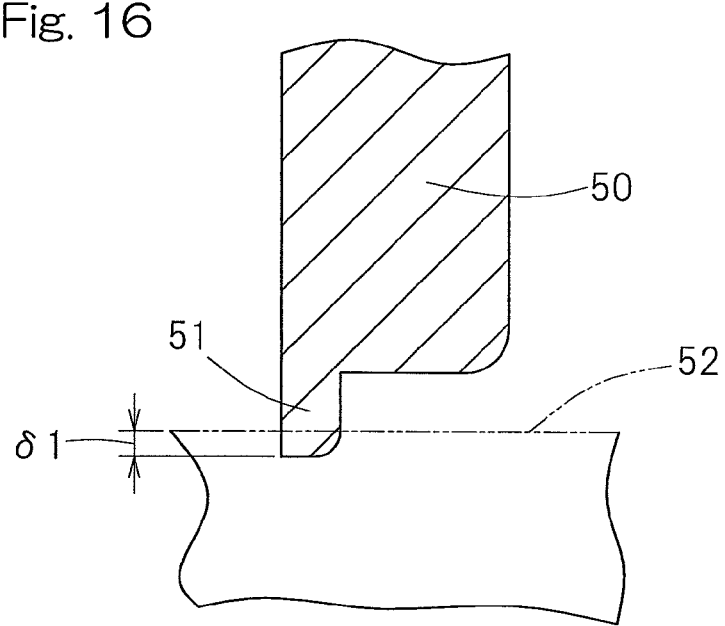
FIG. 16 is a schematic, vertical cross sectional view of a seal lip segment of a conventional product.

In the fourth and fifth embodiments, as shown in FIG. 13 and FIG. 15, the seal member 5 may be mold with the seal production mold 14A or 14B such that the elastic member 7 is fixedly adhered to the metal core 6 in the seal production mold 14A or 14B. However, the present invention is not limited to such a configuration. For instance, only the elastic member 7 may be molded in a seal production mold 14A or 14B, and the elastic member 7 may subsequently be assembled integrally to the metal core 6 to cover the metal core 6.

The seal lip segment 9D may be shaped to include a first subsegment that axially contacts with a surface and to also include a second subsegment that radially contacts with a surface. Rotation in the bearing assembly may result in both wear of a lip tip end 9Dca at the first subsegment and wear of a lip tip end 9Dca at the second subsegment. In this way, inner side and outer side labyrinth gaps may be created, each of which may be defined by the corresponding one of a lip tip end 9Dca at the first subsegment and a lip tip end 9Dca at the second subsegment. This may more reliably prevent possible contaminants from entering the inside of the bearing assembly.

As is the case with a rolling contact bearing assembly according to any one of the preceding embodiments, a sealed bearing assembly according to any one of the fourth and fifth embodiments of the present invention that are described above may be incorporated into or employed in a vehicle transmission, producing effect(s) or advantage(s) that is/are similar to the effect(s) or advantage(s) which may be obtained with a rolling contact bearing assembly according to any one of the preceding embodiments. To avoid redundancy, the detailed discussion of such effect(s) or advantage(s) will be omitted.

The fourth and fifth embodiments of the present invention also encompass the following Implementations 1 to 9, where a relief recess and/or a V-shaped waist portion of the present invention may be omitted.

[Implementation 1]

The Implementation 1 may provide a sealed bearing assembly which includes an inner raceway ring including a raceway surface, an outer raceway ring including a raceway surface, a plurality of rolling elements interposed between the raceway surface of the inner raceway ring and the raceway surface of the outer raceway ring, and a seal member sealing a bearing space defined between the inner and outer raceway rings. The seal member has a base end and a tip end that is opposite to the base end. The base end of the seal member is secured to one of the inner and outer raceway rings. The seal member includes a seal lip segment at the tip end of the seal member. The seal lip segment is in contact with the other one of the inner and outer raceway rings. The seal lip segment may include molded rubber material or molded resinous material, in which the seal lip segment may include a seal lip slidingly movable portion that is protruding from an inner or outer peripheral edge of the seal lip segment to be in slidingly contact with the other one of the inner and outer raceway rings, in which the seal lip slidingly movable portion may correspond to an area molded at a parting line of a seal production mold that molds the seal member in such a way that a lip tip end at the seal lip slidingly movable portion aligns with the parting line, in which the lip tip end may include a burr, and in which the lip tip end including the burr may include such high wear material that rotation in the bearing assembly results in wear of the lip tip end to cause the lip tip end to be no longer in contact or to be in light contact with the other one of the inner and outer raceway rings, with the light contact being defined as contact with a contact pressure that is substantially zero.

The term "high wear material" used herein refers to material that is prone to wear.

With such a configuration, the seal member that is initially a contact-type seal member will be worn during operation and will quickly turn into a non-contact type or light-contact type seal member.

In particular, the seal lip slidingly movable portion of the seal lip segment will be worn in a way that reduction or elimination of a sealing torque will be quickly but sufficiently achieved. More specifically, the tip lip end at the seal lip slidingly movable portion which may, when molded, align with a parting line of the seal production mold may include a burr, and the lip tip end including the burr will be worn. The burr at the lip tip end may define a starting point of the wear, thus facilitating the wear of the seal lip slidingly movable portion. To cause a seal lip segment to be quickly worn, a lip tip end may need to include thinner portions. Molding such thinner portions, however, may be difficult and may result in reduced yield.

In contrast, in the Implementation 1, a beneficial use of "burr" may be made, which may be an inevitable outcome of a molding process and which is, in principle, unwanted. Tiny little burr(s) that may be present on the lip tip end may have small contact surface area(s), against the other one of the inner and outer raceway rings. In this way, such burr(s) will be quickly ground away during operation of the bearing assembly.

As such, a lip tip end may be worn more quickly than a conventional product, thus facilitating reduction or elimination of a sealing torque. Also, a deburring treatment of the seal lip slidingly movable portion after a seal molding process may not be necessary. This may enable reduction of the number of processing steps, which may, in turn, enable reduction of production cost.

[Implementation 2]

In the Implementation 1, the seal lip slidingly movable portion may be configured such that rotation in the bearing assembly results in wear of only the burr. In this case, only the burr will be worn unlike configuration(s) where portions with larger sliding contact surfaces are designed to be worn. In this way, a lip tip end may be worn more quickly than a conventional product.

[Implementation 3]

In the Implementation 1 or 2, the outer raceway ring may include a peripheral surface confronting the other raceway ring, in which the peripheral surface may include a seal mount groove into which the seal member is fittedly secured, in which the seal member may include an annular metal core and elastic member provided integrally with the metal core to cover the metal core, in which a part of the metal core and a part of the elastic member may form the base end of the seal member, and in which the base end of the seal member may form a mountable segment of the seal member that is fittedly secured into the seal mount groove. In such a configuration, the mountable segment of the seal member may be securely and firmly fitted into the seal mount groove, thus further improving the wearability of the seal lip slidingly movable portion.

[Implementation 4]

In any one of the Implementations 1 to 3, the seal production mold that molds the seal member may include first and second mold dies, in which the first mold die may include an annular cavity segment designed to form an inner side part of the seal member, in which the second mold die may include an annular cavity segment designed to form an outer side part of the seal member, in which the first and second mold dies may be configured to mate with each other to create a cavity in which the seal member is molded, and in which mate faces of these two mold dies may define the parting line. In this case, the lip tip end that is intended to be worn may be molded at or between the mate surfaces of these two mold dies. This may ensure the formation of the burr through a molding process, which will be worn during operation of the bearing assembly.

[Implementation 5]

In any one of the Implementations 1 to 4, only the seal lip slidingly movable portion of the seal lip segment may include the high wear material. In such a configuration, other areas of the seal lip segment may be made of general material, thus enabling reduction of material cost.

[Implementation 6]

In any one of the Implementations 1 to 5, the seal member may include a vulcanization-molded article of rubber material. In this way, rubber material may be firmly adhered to component(s) of the seal member—for example, the metal core—in a vulcanization molding process.

[Implementation 7]

In any one of the Implementations 1 to 5, the seal member may include an annular metal core and elastic member assembled integrally to the metal core to cover the metal core.

[Implementation 8]

In any one of the Implementations 1 to 7, the seal lip slidingly movable portion may be shaped to radially contact the other one of the inner and outer raceway rings.

[Implementation 9]

In any one of the Implementations 1 to 8, the seal lip slidingly movable portion may be shaped to axially contact the other one of the inner and outer raceway rings.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE SIGNS

1: Inner raceway ring
2: Outer raceway ring
1a, 2a: Raceway surface
3: Rolling element
4: Cage
5: Seal member
6: Metal core
7: Elastic member
8: Seal member body
9, 9A, 9B, 9C, 9D: Seal lip segment
11: Waist portion
12: Protrusion portion
13: Relief recess

What is claimed is:

1. A rolling contact bearing assembly comprising:
an inner raceway ring including a raceway surface;
an outer raceway ring including a raceway surface;
a plurality of rolling elements interposed between the raceway surface of the inner raceway ring and the raceway surface of the outer raceway ring; and
a seal member to seal a bearing space defined between the inner raceway ring and the outer raceway ring;
the seal member including a seal member body having a base end secured to one of the inner and outer raceway rings and a tip end formed with a seal lip segment that is in contact with the other one of the inner and outer raceway rings;
the seal lip segment including a waist portion forming a radially intermediate area of the seal lip segment, the seal lip segment having, as viewed in a cross section, a bent V-shape at the waist portion such that a surface of the seal lip segment facing an outer side of the bearing space defines a relief recess;
the seal lip segment also including a protrusion portion that is distal with respect to the waist portion, the protrusion portion having a tapered shape that narrows towards a free end of the protrusion portion;
the seal member being installed to the bearing assembly in such a way to apply an urging force on the other one of the inner and outer raceway rings, against a change in the degree of interference of the protrusion portion with the other one of the inner and outer raceway rings;
the seal lip segment being positioned such that a portion of the seal lip segment in radial contact with the other one of the inner and outer raceway rings is axially positioned within an axial width of the narrowest portion of the waist portion; and
the protrusion portion of the seal lip segment including such high wear material that rotation of the bearing assembly results in wear of the protrusion portion to cause the protrusion portion to make non-contact status or light contact status of a contact pressure that is substantially zero.

2. The rolling contact bearing assembly as claimed in claim 1, wherein the high wear material comprises rubber material or resinous material.

3. The rolling contact bearing assembly as claimed in claim 2, wherein the high wear material comprises rubber material, and wherein the seal member includes a vulcanization-molded article of the rubber material.

4. The rolling contact bearing assembly as claimed in claim 2, wherein the high wear material comprises resinous material, and wherein the seal member includes an injection-molded article of the resinous material.

5. The rolling contact bearing assembly as claimed in claim 1, wherein the seal member includes an annular metal core and an elastic member covering a part or an entirety of the metal core, and wherein the seal lip segment includes the elastic member.

6. The rolling contact bearing assembly as claimed in claim 5, wherein the seal member includes the elastic member that is vulcanization-molded or injection-molded to a part or an entirety of the metal core.

7. The rolling contact bearing assembly as claimed in claim 1, wherein the high wear material comprises solid lubricant, non-woven fabric or mild steel.

8. The rolling contact bearing assembly as claimed in claim 1, wherein the seal lip segment is so shaped as to radially contact the other one of the inner and outer raceway rings.

9. The rolling contact bearing assembly as claimed in claim 1, wherein the seal member body includes, at the base end of the seal member body, an elastic member made of a rubber material, and wherein the elastic member is fittedly secured to the one of the inner and outer raceway rings.

10. The rolling contact bearing assembly as claimed in claim 1, wherein the seal member body includes, at the base end of the seal member body, a metal core made of metallic material, and wherein the metal core is fittedly secured to the one of the inner and outer raceway rings.

11. The rolling contact bearing assembly as claimed in claim 1, wherein the bearing assembly is configured to be employed in a vehicle transmission.

12. A rolling contact bearing assembly comprising:
an inner raceway ring including a raceway surface;
an outer raceway ring including a raceway surface;
a plurality of rolling elements interposed between the raceway surface of the inner raceway ring and the raceway surface of the outer raceway ring; and
a seal member to seal a bearing space defined between the inner raceway ring and the outer raceway ring;
the seal member including a seal member body having a base end secured to one of the inner and outer raceway rings and a tip end formed with a seal lip segment that is in contact with the other one of the inner and outer raceway rings;
the seal lip segment including a waist portion forming a radially intermediate area of the seal lip segment, the seal lip segment having, as viewed in a cross section, a bent V-shape at the waist portion such that a surface of the seal lip segment facing an outer side of the bearing space defines a relief recess;
the seal lip segment also including a protrusion portion that is distal with respect to the waist portion, the protrusion portion having a tapered shape that narrows towards a free end of the protrusion portion;
the seal member being installed to the bearing assembly in such a way to apply an urging force on the other one of the inner and outer raceway rings, against a change in the degree of interference of the protrusion portion with the other one of the inner and outer raceway rings;
the protrusion portion of the seal lip segment including such high wear material that rotation of the bearing assembly results in wear of the protrusion portion to cause the protrusion portion to make non-contact status or light contact status of a contact pressure that is substantially zero;
the protrusion portion of the seal lip segment includes molded rubber material or molded resinous material, and includes a seal lip slidingly movable portion that is configured to protrude from an inner peripheral edge or an outer peripheral edge of the protrusion portion to be in slidingly contact with the other one of the inner and outer raceway rings, wherein the seal lip slidingly movable portion is formed along a parting line of a seal production mold that molds the seal member, the seal lip slidingly movable portion including a lip tip end, positioned on the parting line, formed with a burr; and
the lip tip end including the burr includes such high wear material that rotation of the bearing assembly results in wear to cause the protrusion portion to make non-contact status or light contact status of a contact pressure that is substantially zero.

13. The rolling contact bearing assembly as claimed in claim 12, wherein the seal lip slidingly movable portion is configured such that rotation in the bearing assembly results in wear of only the burr.

14. The rolling contact bearing assembly as claimed in claim 12, wherein the one of the inner and outer raceway rings includes a peripheral surface, confronting the other one of the inner and outer raceway rings, formed with a seal mount groove into which the seal member is fittedly secured, wherein the seal member includes an annular metal core and an elastic member provided integrally with the metal core to cover the metal core, and wherein a part of the metal core and a part of the elastic member form a base end of the seal member forming a mountable segment that is fittedly secured into the seal mount groove.

15. The rolling contact bearing assembly as claimed in claim 12, wherein the seal production mold that molds the seal member includes first and second mold dies, wherein the first mold die includes an annular cavity segment designed to form an inner side part of the seal member, wherein the second mold die includes an annular cavity segment designed to form an outer side part of the seal member, wherein the first and second mold dies are configured to mate with each other to create a cavity in which the seal member is molded, and wherein mate faces of these two mold dies define the parting line.

16. The rolling contact bearing assembly as claimed in claim 12, wherein only the seal lip slidingly movable portion of the seal lip segment includes the high wear material.

* * * * *